(12) United States Patent
Reiss et al.

(10) Patent No.: US 9,639,908 B1
(45) Date of Patent: May 2, 2017

(54) VARIABLE DELIVERY ZONES FOR DELIVERY ORDERS

(71) Applicant: Square, Inc., San Francisco, CA (US)

(72) Inventors: Jesse Lee Reiss, San Francisco, CA (US); Benjamin R. Bernstein, San Francisco, CA (US); Matthew Rhodes, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 14/663,671

(22) Filed: Mar. 20, 2015

(51) Int. Cl.
| | |
|---|---|
| G06Q 50/12 | (2012.01) |
| G06Q 10/08 | (2012.01) |
| H04W 4/02 | (2009.01) |
| G01S 19/14 | (2010.01) |
| G01S 5/02 | (2010.01) |
| G01C 21/36 | (2006.01) |

(52) U.S. Cl.
CPC ......... *G06Q 50/12* (2013.01); *G01C 21/3691* (2013.01); *G01S 5/0294* (2013.01); *G01S 19/14* (2013.01); *G06Q 10/0832* (2013.01); *H04W 4/027* (2013.01)

(58) Field of Classification Search
USPC ................................ 705/28, 15, 16; 426/233
See application file for complete search history.

(56) References Cited

U.S. PATENT DOCUMENTS

| | | | |
|---|---|---|---|
| 2002/0138350 A1* | 9/2002 | Cogen | 705/15 |
| 2006/0235754 A1* | 10/2006 | Walker et al. | 705/15 |
| 2009/0106124 A1* | 4/2009 | Yang | G06Q 10/08 705/26.1 |
| 2009/0187488 A1* | 7/2009 | Shamilian | G06Q 10/02 705/16 |
| 2009/0307096 A1* | 12/2009 | Antonellis | G06Q 10/087 705/15 |
| 2010/0076853 A1* | 3/2010 | Schwarz | 705/15 |
| 2013/0226651 A1* | 8/2013 | Napper | G06Q 10/08 705/7.26 |
| 2014/0188637 A1* | 7/2014 | Balasubramaniam et al. | 705/15 |
| 2014/0370167 A1* | 12/2014 | Garden | G06Q 50/12 426/233 |

\* cited by examiner

*Primary Examiner* — Vanel Frenel
(74) *Attorney, Agent, or Firm* — Mattingly & Malur, PC

(57) ABSTRACT

In some examples, a service provider may receive an indicated delivery location from a buyer device. The service provider may determine, based at least in part on traffic information, respective predicted courier travel times to the delivery location from a plurality of different merchant locations. The service provider may compare the respective predicted courier travel times with respective spoilage times for items offered by the corresponding merchants, and may identify one or more items having respective spoilage times greater than the respective predicted courier travel time from that merchant location. The service provider may send, to the buyer device, information about items available to be ordered from particular merchants having respective spoilage times greater than the predicted courier travel time from respective the merchant location. The buyer device may present the item information on a display to enable buyer selection of an item for delivery.

4 Claims, 12 Drawing Sheets

VARIABLE DELIVERY ZONES FOR DELIVERY ORDERS

BACKGROUND

People enjoy eating quality food that is prepared by good restaurants. Nevertheless, sometimes people may not want to go to a restaurant, but instead may prefer to have food delivered to them. To meet this demand, a courier may deliver food prepared by a restaurant to a customer at a delivery location. For example, a service may enable customers to order food items from any of a variety of restaurants, and may arrange for couriers to deliver the food items from the restaurants to the customers. However, if it takes too long for the courier to deliver the food from the restaurant to the customer, the food items may be delivered late, may be delivered cold, and/or may be delivered under other unsatisfactory circumstances. Accordingly, a restaurant with a delivery service will usually establish a fixed delivery zone and will not deliver to customers located outside of this fixed zone.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
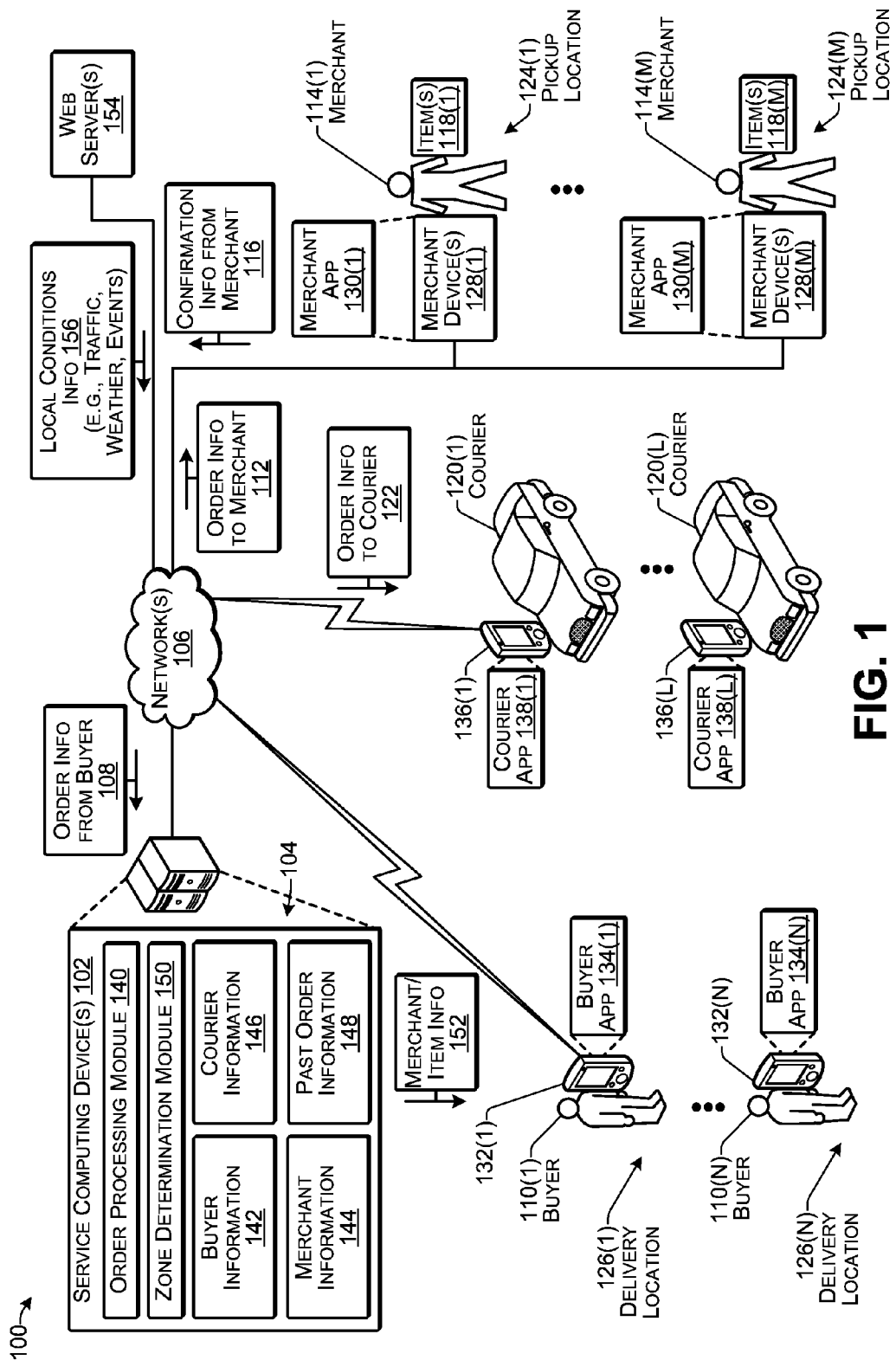
FIG. 1 illustrates an example environment for providing variable delivery zones according to some implementations.

The technology herein provides a novel system and environment in which buyers, who want to place orders for delivery, may be constrained to ordering from certain merchants and/or ordering certain items from certain merchants based on variations in local conditions. For instance, a buyer who is placing an order may be presented with the opportunity to order from selected merchants and/or order selected items from the selected merchants based on a delivery location associated with the buyer and predicted courier travel time between the delivery location and the selected merchants. In some cases, the delivery location of the buyer may be determined by a GPS (Global Positioning System) receiver or other location sensor onboard a buyer device, and this location information may be transmitted to a service computing device as the indicated delivery location. The technology herein employs a plurality of computing devices, mobile devices, and location sensors to provide a novel technological arrangement that provides buyers varying options for ordering merchants and items based at least in part on delivery location and local conditions, such as traffic, weather, local events, and the like.

Additionally, some implementations herein provide technological innovations that enable people to participate as couriers in a new type of crowdsourced service economy. With the technology herein, essentially any person with a mobile device is able to immediately become a courier, or cease to be a courier, in a courier network that provides delivery services for delivery of items from merchants to buyers. Additionally, through the interaction of the plurality of computing devices, mobile devices, and location sensors, implementations herein are able to track the movement of couriers throughout a service region over time, and can use this information to assist in predicting courier travel times to various delivery locations for various different times of days and days of the week.

Furthermore, some examples described herein include techniques and arrangements for employing variable delivery zones with delivery orders based at least in part on regional conditions, buyer delivery location, merchant pickup location, and the like. For instance, a service provider may provide a delivery service that enables buyers to order items, such as food items or other goods from merchants, such as restaurants. When placing an order with a merchant, the buyer may use a buyer application on a buyer device, such as a mobile device or other computing device, to browse through the items available from various different merchants. The buyer may select a particular item to order from a particular merchant and the service may send information about this selection to the particular merchant. Further, the service may arrange for a courier to pick up the ordered item from the merchant and deliver the item to the buyer.

In some examples herein, at least one respective delivery zone may be determined for each merchant, such as based in part on spoilage times for items offered by each merchant. Further, respective delivery zones may also be determined for individual items offered by each merchant and/or categories of items offered by each merchant, such that each merchant may have multiple different delivery zones for different items offered by the that merchant. Accordingly, a delivery zone may be determined as geographic area in which an item can be delivered without experiencing spoilage prior to being delivered to a delivery location of the buyer. A spoilage time may be the time between when an ordered item is ready for pickup and when the ordered item is considered to be of degraded quality, e.g., cold, soggy, melted, wilted, oxidized, or otherwise less palatable than would be normally expected by the buyer.

The delivery zone of a particular merchant may expand and contract with changes in traffic conditions, weather, and/or other local conditions. For example, a particular merchant may have a very large delivery zone in the mid-afternoon when traffic is light because couriers are able to travel at maximum legal speeds at that time. However, after rush hour starts, the delivery zone of the particular restaurant may shrink dramatically, such as due to heavy traffic causing the couriers to travel much more slowly. Additionally, in some examples, the delivery zone of a particular merchant may be defined, and may change, on a per-item basis and/or a per-item-category basis. For example, some categories of items, such as a salad, may have a high spoilage time and can typically be delivered much farther at a given courier speed than other categories of items, such as French fries, that may spoil quickly, such as by becoming cold and soggy.

Furthermore, based on the variable delivery zones for particular merchants and/or particular items or item categories, a buyer application on a buyer device may present the buyer with different menus for particular merchants depending on the projected travel time from each merchant to the delivery location of the buyer. For instance, as the individual delivery zones of the merchants expand and contract based on the local conditions, the buyer may be presented with an expanding and contracting selection of merchants from whom the buyer may order. Additionally, the menu of items offered by each merchant may change depending on the spoilage times of the individual items presented in the menu associated with each merchant. As one example, if a buyer is not currently able to order a particular item for immediate delivery, the buyer application may provide an option for the buyer to place the order now and have the order arrive in several hours after the local traffic is predicted to subside. In some cases, each delivery zone may be determined based on a radius, oval, or other suitable shape around a pickup location of a respective merchant. In other examples however, each delivery zone may be determined more precisely as a respective polygon or partial polygon around each pickup location, such as with the outer perimeter of the polygon being aligned with individual streets at the edges of the respective delivery zone.

In some examples, travel time from a particular merchant location to potential delivery locations may be determined based on map information and current or predicted traffic conditions, as well as weather conditions, local events or street closures, local construction, tolls, geological features, and so forth. Furthermore, predicted spoilage times for items may be determined based on spoilage information received from particular merchants and/or empirical spoilage information gathered from deliveries made over a past period of time, as well as current or predicted weather conditions, such as current or predicted ambient temperature, sunny, cloudy or rainy weather, and so forth.

In addition, in some cases, the delivery zones may be based at least in part on a cost function that takes into account tolls, actual spoilage, and predicted travel time, and which may determine the boundary of the delivery zone at a point at which the cost becomes prohibitive. For instance, a particular delivery zone may be determined based on probability of spoilage or non-spoilage, e.g., if there is a 90 percent or greater probability that an item can be delivered to a location at a particular time without spoilage, then the location may be included in the delivery zone for that item. This determination can be refined based on feedback from the buyers or the couriers, e.g., whether an item for a delivered order had to be refunded or switched out for another item with a longer spoilage time. Furthermore, the cost function may treat a toll as another cost of the order, which would tend to make deliveries requiring payment of a toll less likely, as the cost of the toll increases relative to the cost of the order. Additionally, or alternatively, tolls or geological features, such as bodies of water without nearby bridges, may be taken into consideration, and may result in hard cutoffs that might exclude delivery across toll bridges, over toll roads, and/or over geological features that might not be easily traversed.

In some examples, the service provider may receive, from a courier device, a first indication of the time at which the courier picks up the order at the pickup location, and a second indication of a time at which the courier delivers the order to the delivery location. The service may adjust the delivery zones and/or the technique for determining the delivery zones based on the feedback received from the courier devices over a period of time, i.e., based on the difference between predicted courier travel times and actual courier travel times. Further, as mentioned above, the courier fleet may serve as sensors to determine current traffic conditions in the local region, in addition to providing information that may be used to predict courier travel times based on a local conditions during past deliveries as compared with current conditions during a current delivery.

Additionally, in some examples, the merchant menu information presented to the buyer may be determined based at least in part on the travel time to the delivery location of the buyer from the pickup locations of the various merchants in the service region. For example, when a buyer indicates a desired delivery location and a desired (or default) delivery time interval, the service computing device may determine the travel time from each merchant pickup location in the service region to the desired delivery location of the buyer for the delivery time interval, such as based on current traffic conditions and other local conditions. The service computing device (or the buyer application) may then determine which merchants are offering items having predicted spoilage times that are greater than the predicted travel times from the respective merchant pickup locations, and may determine menu information to present to the buyer based on these items. The menu information may be presented by the buyer application on the buyer device. If the buyer changes the delivery location, e.g., to a different delivery location in another part of the city, the menu information presented to the buyer may change to other items and/or other merchants based on the predicted courier travel times between the new delivery location and the respective merchant pickup locations.

In some examples, the service may rely at least in part on historic order information to determine the variable delivery zones, predicted courier travel times and/or predicted spoilage times. Thus, the service may determine, for a plurality of different times of day for a plurality of different days, and for a plurality of orders received for items provided by individual merchants over a past period of time, e.g., a past month, past two months, past year, etc., the actual travel times for delivery of orders and whether any spoilage was indicated to have occurred. Thus, at a current time, the service may receive a communication from a buyer application on a buyer device that includes an indication of a delivery location and an indication of a desired delivery time interval and day for an order that the buyer would like to place. Based on these inputs, the service may send, to the buyer application on the buyer device, menu information associated with items available to be ordered from individual merchants having respective predicted spoilage times greater than the respective predicted the courier travel times.

In some cases, the determination of respective delivery zones may be performed on the buyer device, rather than on a service computing device of the service provider. For example, the buyer application on the buyer device may keep track of the location of the buyer device using an onboard GPS receiver or other location sensor. The buyer application may periodically update the item delivery zones and/or merchant delivery zones based on received information, such as traffic information, weather information and local event information.

As used herein, an order may include a request submitted by a buyer (e.g., a customer) for the acquisition of food items and/or other goods (referred to herein as items) from a merchant. The order information may be received by the service and sent to the merchant. For example, a merchant may include a restaurant or any other business or other entity engaged in the offering of items for delivery to buyers. Actions attributed to a merchant herein may include actions performed by employees or other agents of the merchant and, thus, no distinction is made herein between merchants and their employees unless specifically discussed. In addition, a buyer may include any entity that purchases items from a merchant. Buyers may be customers or potential customers of a particular merchant. The service may receive payment from a buyer for an order and the service may provide payment to the merchant for the order. Further, the service may provide payment to the courier for delivering the order.

For discussion purposes, some example implementations are described in the environment of enabling buyers to place orders with merchants for delivery, such as to provide variable delivery zones based on varying local conditions. However, implementations herein are not limited to the particular examples provided, and may be extended to other service environments, other system architectures, other types of goods, other conditions, and so forth, as will be apparent to those of skill in the art in light of the disclosure herein.

FIG. 1 illustrates an example environment 100 enabling variable delivery zones according to some implementations. The environment 100 includes one or more service computing devices 102 of a service provider 104 that may receive, over one or more networks 106, order information 108 from a plurality of buyers 110(1)-110(N). The order information 108 may include information about at least one order placed by at least one of the buyers 110. Based on the order information 108 received from a particular buyer 110, the service computing device 102 may send order information 112 to a particular merchant 114 of a plurality of merchants 114(1)-114(M). The particular merchant 114 may receive the order information 112, and may respond with confirmation information 116 to confirm that the particular order has been received and will be prepared by the particular merchant 114.

In some examples, the order information 112 sent to the merchant 114 may identify items 118 ordered by the buyers 110 from the particular merchant 114. For instance, each merchant 114(1)-114(M) may offer one or more respective items 118(1)-118(M), which may be ordered by buyers 110 for delivery. In some cases, the order information 112 may also specify a time at which the order is to be picked up by a courier 120 of a plurality of couriers 120(1)-120(L). For instance, the confirmation information 116 sent by the merchant 114 to the service computing device 102 may confirm the pickup time specified by the service computing device 102. In other cases, the order information 112 sent to the merchant 114 may include an inquiry as to when the order will be ready, and the merchant 114 may include with the confirmation information 116 a specified time at which the order will be ready for pickup.

In either event, in response to receiving the confirmation information 116 from the particular merchant 114, the service computing device 102 may send order information 122 to a particular courier 120 who will pick up the order from the particular merchant 114 and deliver the order to the buyer 110 who placed the order. For instance, each merchant 114(1)-114(M) may be associated with a respective pickup location 124(1)-124(M), which may typically be the merchant's place of business. Furthermore, each buyer 110(1)-110(N) may be associated with a respective delivery location 126(1)-126(N) to which the order is to be delivered.

The order information 122 sent to the courier 120 may include the pickup location 124 for the order, the pickup time, and the delivery location 126 for the order. In some examples, the order information 122 may further include a contract time, i.e., a delivery time by which the service provider 104 has agreed to have the ordered item(s) 118 delivered to the buyer 110 at the delivery location 126. Further, in some cases, the order information 122 may include an amount that the courier 120 will be paid if the courier 120 accepts the delivery job, and/or other information related to the order.

In the illustrated example, the service computing device 102 of the service provider 104 is able to communicate with merchant devices 128(1)-128(M) over the one or more networks 106. Each merchant device 128(1)-128(M) may be associated with a respective merchant 114(1)-114(M). Each merchant device 128(1)-128(M) may be a computing device, such as a desktop, laptop, tablet, smart phone, or the like, and may include a respective instance of a merchant application 130(1)-130(M) that executes on the respective merchant device 128(1)-128(M). For example, the merchant application 130 may be configured to communicate with the service computing device 102, such as for receiving the order information 112 and for sending the confirmation information 116. In some examples, the merchant application 130 and the service computing device 102 may communicate with each other via one or more application programming interfaces (APIs). Further, the merchant device 128 may include one or more output devices, such as speakers (not shown in FIG. 1), that the merchant application 130 may use to audibly notify the respective merchant 114 that an order has been received. Additionally, or alternatively, the merchant device 128 may include a display (not shown in FIG. 1) that the merchant application 130 may use for presenting the order information 112 to the merchant 114. For instance, the merchant application 130 on the merchant device 128 may present the order information 112 in one or more graphic user interfaces (GUIs).

In some examples, the merchant application 130 may provide point-of-sale (POS) functionality to the merchant device 128 to enable the merchant 114 to accept payments using the merchant device 128. Alternatively, in some examples, the merchant device 128 may be a fax machine and the merchant 114 may receive the order information 112 via a facsimile transmission from the service computing device 102. As still another example, the merchant device 128 may be a computing device that is configured to receive order information via email, instant messaging, or other electronic communication. As still another example, the merchant device 128 may include a phone, and the merchant device 128 may receive the order information 112 via an SMS text message, voicemail, telephone call, or the like.

In addition, the buyers 110(1)-110(N) may be associated with respective buyer devices 132(1)-132(N) that may execute respective instances of buyer applications 134(1)-134(N). For example, buyers 110 may use buyer devices 132, such as smart phones, tablet computers, wearable computing devices, laptops, desktops, or the like, and these buyer devices 132 may have installed thereon the buyer application 134. The buyer application 134 may enable the buyer 110 to select one or more of the items 118 to purchase from one or more of the merchants 114 to be delivered to the buyer 110 by one or more of the couriers 120. For example, the buyer application 134 may present one or more GUIs on a display for enabling the buyer 110 to select one or more of the items 118 for an order.

Further, the buyer application 134 may enable the buyer 110 to place an order from a merchant 114 in advance, such as for scheduling an order for delivery at a later time on the same day, at a specified time on a future day, or the like. For instance, the buyer 110 may be able to place an order through the buyer application 134 to have lunch delivered at a specified delivery location by a specified time on a specified day. The buyer application 134 may further enable the buyer 110 to make a payment for an order using the buyer application 134. For instance, the service provider 104 may charge a buyer account associated with the buyer 110 for an amount associated with a particular order. In some examples, the buyer application 134 and the service computing device 102 may communicate with each other via one or more APIs. Additionally, or alternatively, the buyer application 134 may be a web browser, or the like, and the buyer 110 may navigate to a website associated with the service provider 104, and may use the website associated with the service provider 104 to place an order. Thus, in this case, the website may provide at least some of the functionality attributed to the buyer application herein.

In addition, the couriers 120(1)-120(L) may be associated with respective courier devices 136(1)-136(L) that may execute respective instances of courier applications 138(1)-138(L). For example, couriers 120 may use courier devices 136, such as smart phones, tablet computers, wearable computing devices, laptops, or the like, and these courier devices 136 may have installed thereon the courier application 138. The courier application 138 may be configured to receive the order information 122 from the service computing device 102 to provide a particular courier 120 with information for picking up a particular order from a merchant's pickup location 124 and for delivering the order to a buyer delivery location 126. The courier application 138 may further enable the courier 120 to respond to the service computing device 102 to confirm acceptance of a delivery job.

Additionally, in some cases, the courier application 138 may provide the service computing device 102 with an indication of a current location of a particular courier 120. For instance, one or more location sensors associated with each courier device 136 of an active courier 120 may provide location information and, based on this, the courier application 138 may send location information to the service computing device 102, such as by providing an indication of a geographic location of each courier device of each active courier. Thus, a subset of courier devices 136 associated with active couriers may communicate with the service computing device 102, and may send location information obtained from one or more location sensors associated with each courier device 136, such as a GPS receiver (not shown in FIG. 1). In some cases, another subset of courier devices 136 associated with the inactive couriers may be periodically pinged by the service computing device 102 to determine interest in becoming active and, if so, requesting current location information of the associated inactive courier. Couriers who are interested in being activated may allow their courier devices 136 to respond with their location information, while those who are not interested in being activated may keep their location information private by not responding. In some examples, the courier application 138 and the service computing device 102 may communicate with each other via one or more APIs. Alternatively, in other examples, the courier device 136 may receive the order information 122 via an SMS text message, a voicemail, a telephone call, or the like.

The one or more networks 106 can include any appropriate network, including a wide area network, such as the Internet; a local area network, such an intranet; a wireless network, such as a cellular network, a local wireless network, such as Wi-Fi and/or close-range wireless communications, such as BLUETOOTH® and BLUETOOTH® low energy; a wired network, including fiber optics and Ethernet; or any other such network, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing device 102, the merchant devices 128, the buyer devices 132, and/or the courier devices 136 are able to communicate over the one or more networks 106 using wired or wireless connections, and combinations thereof.

In the illustrated example, the service computing device 102 includes an order processing module 140 that may be executed on the service computing device 102 to provide, at least in part, the order processing functionality attributed to the service computing device 102. The order processing module 140 may receive the order information 108 from the buyers 110 and may associate the order information 108 with buyer information 142 and merchant information 144. For instance, based on buyer identifying information that may be included with the order information 108, the order processing module 140 may associate particular order information 108 with a particular buyer account. The order processing module 140 may access a buyer account included in the buyer information 142 to charge a particular buyer account for a particular order.

Furthermore, based on a particular merchant 114 identified by the order information 108, the order processing module 140 may associate the order information 108 with a merchant account of a particular merchant. The order processing module 140 may access the merchant account to determine contact information for sending the order information 112 to the correct merchant device 128 so that the particular merchant can receive and provide confirmation of the order. The order processing module 140 may further access the merchant account of the particular merchant to credit payment to the particular merchant that prepares the order.

In addition, the order processing module 140 may access courier information 146 to determine courier contact information for sending the order information 122 to a particular courier 120 of the plurality of couriers 120(1)-120(L) to determine whether the particular courier 120 is willing to accept the delivery job of delivering the order to the buyer.

The particular courier 120 may use the courier application 138 on the courier device 136 to receive a message with information about the order, and to respond with acceptance of the delivery job if the job assignment is accepted. The particular courier 120 may subsequently pick up the order from the particular merchant 114 and deliver the order to the particular buyer 110 at a specified delivery location 126. When the courier 120 has completed delivery of the order to the delivery location 126, the courier 120 may use the courier application 138 to inform the order processing module 140 that the delivery has been completed. The order processing module 140 may access a courier account included in courier information 146 for the particular courier 120 to credit the courier account of the particular courier 120 with payment for the delivery job.

The order processing module 140 may store information associated with each order as past order information 148. For instance the past order information 148 may include a day of the week, date, and time of day at which each order is received from the respective buyer 110. The past order information 148 may further include, for each order: merchant identifying information; buyer identifying information; items ordered; the pickup location 124; the delivery location 126; preparation time for the order; location of the courier when the courier accepted the job for delivery of the order; predicted spoilage time for one or more items; time that the order was picked up by the courier; time that the order was delivered; amount paid for the order; feedback including records of any complaints or indications of spoilage; as well as other information, as discussed additionally below.

The service computing device 102 may further include a zone determination module 150 that may be executed by the service computing device 102 to determine respective delivery zones for a plurality of merchants and/or items offered by the merchants based at least in part on an estimated travel time between the respective merchant pickup locations and the delivery location, and conditions within the service region. For example, when placing an order for an item 118 from a particular merchant 114, the buyer 110 may use the buyer application 134 to place the order. The buyer application 134 may present a GUI on the buyer device 132 that enables the buyer 110 to browse through the items available from various different merchants. Prior to presenting the merchant information in the GUI, the buyer application 134 may receive, from the service computing device 102, merchant/item information 152 for the various merchants from which the buyer is able to select, including information about various items offered by the merchants from which the buyer is able to select. For example, when the buyer opens or otherwise accesses the buyer application 134, the buyer application 134 may initially request that the buyer indicate the desired delivery location 126, as well as provide an indication of a delivery time interval and the day on which delivery is desired. The buyer application 134 may send this information to the service computing device 102. In some cases, the delivery location 126 may be the current location of the buyer device 132, which may be determined by one or more location sensors, such as a GPS receiver onboard the buyer device 132. In other cases, the buyer 110 may enter an address as the delivery location, may proceed with a default address, may select a previously used address, or the like. Further, as discussed additionally below, the buyer application 134 may, by default, assume that the buyer is interested in ordering now for immediate delivery, i.e., as soon as the order can be prepared and delivered. Thus, if the buyer is ordering for immediate delivery, the zone determination module 150 may determine a delivery time interval based at least in part on the time at which the communication of the delivery location is received from buyer device. For instance, the delivery time interval may be a window of time during which delivery of the order is expected to take place, e.g., a window of time from 30-60 minutes after the order is placed, or any other suitable time window. If the buyer prefers a later delivery time or date, the buyer may select one or more options in the GUI to select a later time or day, and this time information may be send to the service computing device 102 with the delivery location information.

Based at least in part on the received delivery location and the determined delivery time interval, the zone determination module 150 may determine which respective delivery zones of which individual merchants encompass the delivery location of the buyer 110 for the delivery time interval, and in some examples, may further determine delivery zones for respective categories of items offered by each merchant and/or individual items offered by each merchant. As discussed below with respect to FIG. 2, the zone determination module 150 may determine the delivery zones based on a number of considerations. For instance, the zone determination module 150 may take into consideration the past order information 148 and various other factors, such as traffic, weather, local events, date, etc. As one example, the zone determination module 150 may access one or more web servers 154 or other databases over a network, or other sources of information, to obtain local conditions information 156, such as traffic, weather, local events, road closures, construction, and the like, for a current or future day. As another example, current traffic conditions may be determined based in part on information received from the courier devices, such as by tracking movement of the courier devices within the service region over time through location information received from the GPS receiver onboard each courier device, or the like. For instance, the courier device may be programmed to periodically report a current location to the service computing device.

Based at least in part on these considerations, the zone determination module 150 may predict estimated courier travel times between pickup locations of various merchants and the delivery location of the buyer. Further, the merchant/item information 152 sent to the buyer device may include information about merchants and items available for not only the soonest available delivery time interval, but also during other delivery time intervals on the same day and/or other days, to provide additional selection options to the buyer 110 when selecting items 118 for delivery. The buyer 110 may select a particular item 118 to order from a particular merchant 114 and the service computing device 102 may send information about this selection to the particular merchant 114. Further, the service may arrange for a courier 120 to pick up the ordered item from the merchant 114 and deliver the item to the buyer 110.

Figure 2:
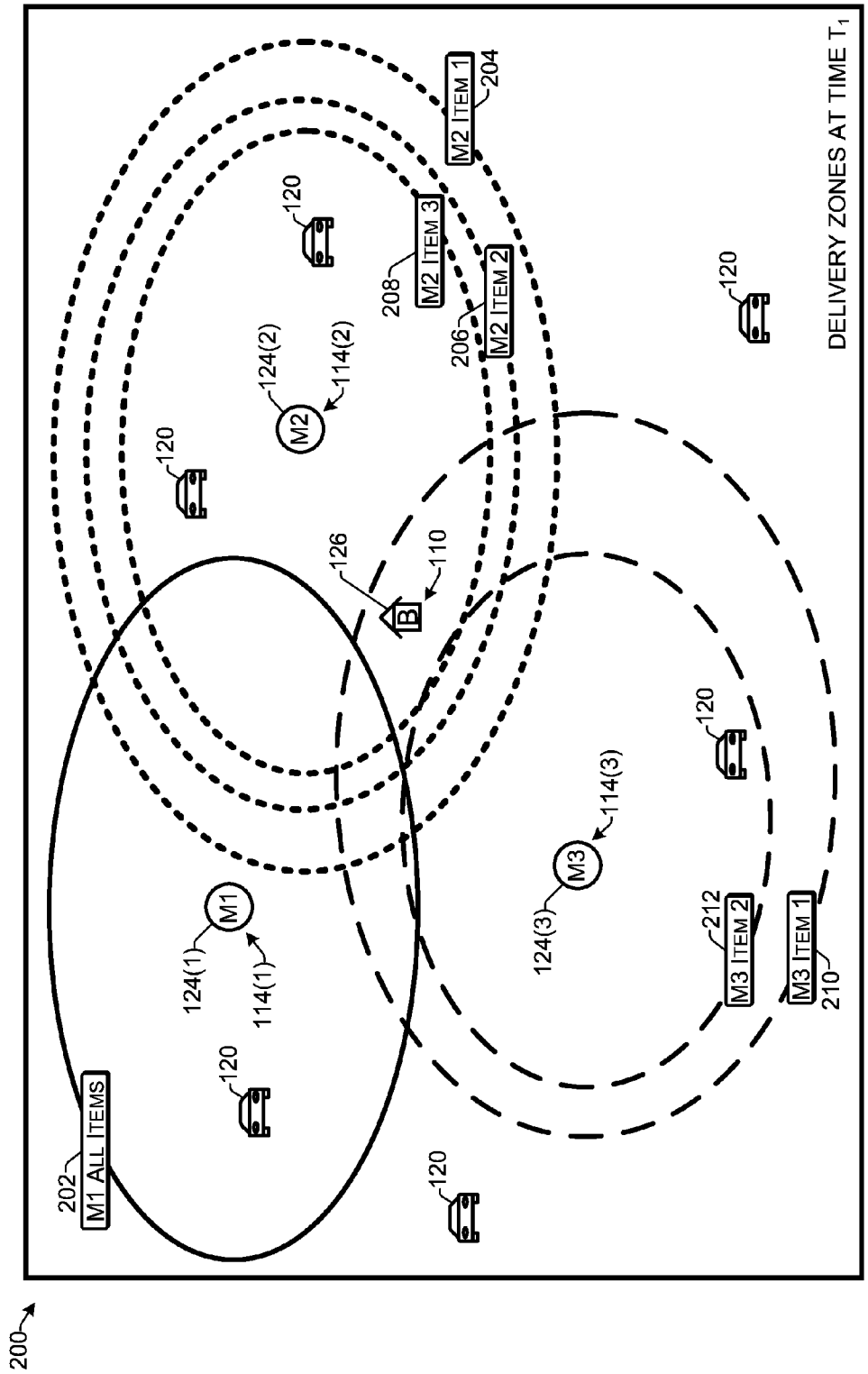
FIG. 2 illustrates example variable delivery zones at a first time according to some implementations.

FIG. 2 illustrates example variable delivery zones at a first time $T_1$ according to some implementations. In the illustrated example, suppose that a rectangle 200 represents at least a portion of a service region. For instance, a service region may be an overall area encompassing a plurality of merchant delivery zones. Within this portion of the service region reside three respective merchant pickup locations 124 associated with three different merchants 114, namely, a first merchant pickup location 124(1) associated with a first merchant 114(1); a second merchant pickup location 124(2) associated with a second merchant 114(2); and a third merchant pickup location 124(3) associated with a third merchant 114(3).

Additionally, suppose each merchant pickup location 124 has at least one associated delivery zone. In this example, suppose that the first merchant pickup location 124(1) has an associated first merchant delivery zone 202 that may apply to all items offered by the first merchant 114(1). Further, suppose that the second merchant pickup location 124(2) has three different delivery zones, including a first delivery zone 204 that applies to a first item or first category of items offered by the second merchant; a second delivery zone 206 that applies to a second item or second category of items offered by the second merchant; and a third delivery zone 208 that applies to a third item or third category of items offered by the second merchant. Additionally, suppose that the third merchant pickup location 124(3) has two different delivery zones, including a first delivery zone 210 that applies to a first item or first category of items offered by the third merchant; and a second delivery zone 212 that applies to a second item or second category of items offered by the third merchant.

In some examples, the delivery zones 202-212 may be determined in advance, such as by calculating the farthest locations in a perimeter around a merchant pickup location that a courier may be able to travel under current local conditions for a given spoilage time. Thus, the service computing device may determine based on predicted courier travel times, how far a courier is predicted to be able to travel in multiple directions from the pickup location in an amount of time corresponding to a particular predicted spoilage time, and may determine a delivery zone perimeter for the delivery zone based on the how far the courier is predicted to be able to travel in the multiple directions from the pickup location. Thus, when a delivery location 126 is received from a buyer, the service computing may merely overly the delivery zones to determine which zones encompass the delivery location. In other examples, as discussed below with respect to FIG. 4, the delivery zones may be determined with respect to an indicated delivery location, such as upon receipt of the delivery location.

Further, there may be a plurality of couriers 120 in the service region. In some examples, the movements of the couriers 120 within the service region may be tracked by the service computing device, such as for determining current traffic conditions within the service region and/or for determining actual courier travel times between a pickup location and a delivery location. This information may be used, at least in part for predicting courier travel times, which may be used at least in part for determining the delivery zones 202-212 at the first time $T_1$, as well as for predicting delivery zones 202-212 at a future time.

In the example of FIG. 2, suppose that a buyer 110 would like to order an item for delivery to the delivery location 126. As one example, the buyer device may use the GPS receiver onboard the buyer device to determine a current location of the buyer device, and may provide this information to the buyer application. The buyer application on the buyer device may determine the delivery location for the order and may present a delivery location in a GUI on the buyer device, as discussed additionally below. In some cases, the buyer device may send the delivery location and an indication of a delivery time to the service computing device. As mentioned above, if specified time information is not entered by the buyer, the buyer application may default to an assumption that the buyer would like to order now for immediate delivery, but may provide the buyer with an option for selecting a later delivery time or date. Thus, unless the buyer has specified a later time for delivery, the buyer application need not send time information to the service computing device, and the service computing device may determine a default delivery time interval, such as 30-60 minutes from receipt of the delivery location from the buyer device, 20-65 minutes, or other suitable time period depending on the average times in the local region for completion of delivery orders. In some cases, the determination of the delivery time interval may be based in part on the current time of day at which the communication is received from the buyer device, e.g., if courier times are short when the communication is received, e.g., at 1:30 pm, then the delivery time interval may be shorter (e.g., within the next 45 minutes) than during rush hour, e.g., from 4:30-6:30 PM, when the delivery time interval may be longer (e.g., within the next hour).

Further, as the service computing device receives updates of local conditions, such as from the couriers 120 and/or from web servers or other sources of information, the service computing device may determine the delivery zones 202-212 for the respective merchants 114(1)-114(3). Accordingly, the delivery zones 202-212 may, in some cases, be determined in advance of receiving a communication from the buyer 110. In other cases, however, the delivery zones 202-212 may be determined on the fly after receiving the indicated delivery location from the buyer device and determining a delivery time interval.

In either case, in response to receiving the buyer delivery location 126, and based in part on a delivery time interval, the service computing device (or in some examples, the buyer application) may determine which of the delivery zones 202-212 encompass the delivery location 126. Thus, in this example, the delivery location 126 is included in all three delivery zones 204-208 of the second merchant 114(2), and is included in the first delivery zone 210 of the third merchant 114(3). Further, the delivery location 126 is outside of the delivery zone 202 of the first merchant 114(1) and is outside the second delivery zone 212 of the third merchant 114(3). Accordingly, the service computing device may send merchant and/or item information to the buyer device based on the delivery zones 204, 206, 208 and 210 within which the delivery location 126 is included.

Based on the merchant and/or item information, the buyer device may present a GUI that includes merchants and items that are available for the buyer to select for delivery during a time period associated with the time $T_1$. Thus, the GUI may indicate that the buyer 110 can order all three items or categories of items offered by the second merchant 114(2), and/or the buyer 110 can order the first item or first category of items offered by the third merchant 114(3). In some examples, the GUI presented on the buyer device may omit the first merchant 114(1) and the second item or second category of items offered by the third merchant 114(3). In other examples, these options may be grayed out, crossed out, or otherwise indicated to be not currently selectable for the current delivery time interval. However, the GUI on the buyer device may include a predicted time at which the first merchant and/or the second item or category of item offered by the third merchant is expected to become available for the delivery location 126. Additional details of the GUI on the buyer device are discussed below with respect to FIGS. 5 and 6.

Figure 3:
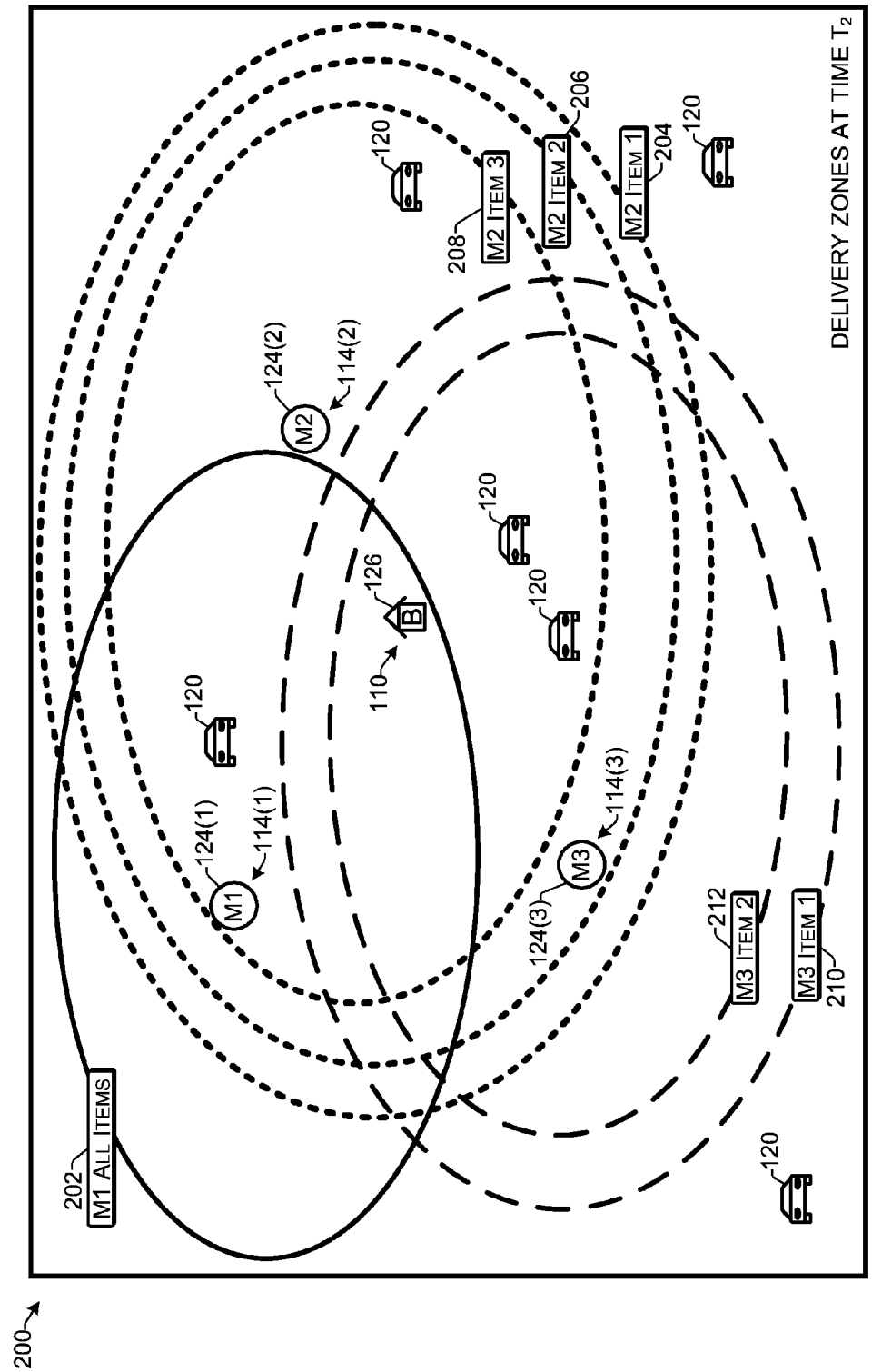
FIG. 3 illustrates example the example variable delivery zones of FIG. 2 at a second time according to some implementations.

FIG. 3 illustrates the example variable delivery zones of FIG. 2 at a second time $T_2$ according to some implementations. In this example, suppose that the local conditions have changed, such as the traffic has become less congested in the service region, weather has improved, or the like. Based at least in part on the change in local conditions, some or all of the delivery zones 202-212 may have expanded based at least in part on a decrease in the respective predicted courier travel times to the delivery location 126 from the pickup locations 124 of the merchants 114. Therefore, the buyer's delivery location 126 at the second time $T_2$ is included in the delivery zone 202 of the first merchant 114(1) and also in the delivery zone 212 of the third merchant 114(3) for the second item or category of item offered by the third merchant 114(3). Accordingly, the buyer application may present in a GUI, for a time period associated with the second time $T_2$, merchant information that includes all items offered by the first merchant 114(1), as well as the second item or category of items offered by the third merchant 114(3), in addition to the items already included for the second merchant and the third merchant in the example of FIG. 2, discussed above.

Figure 4:
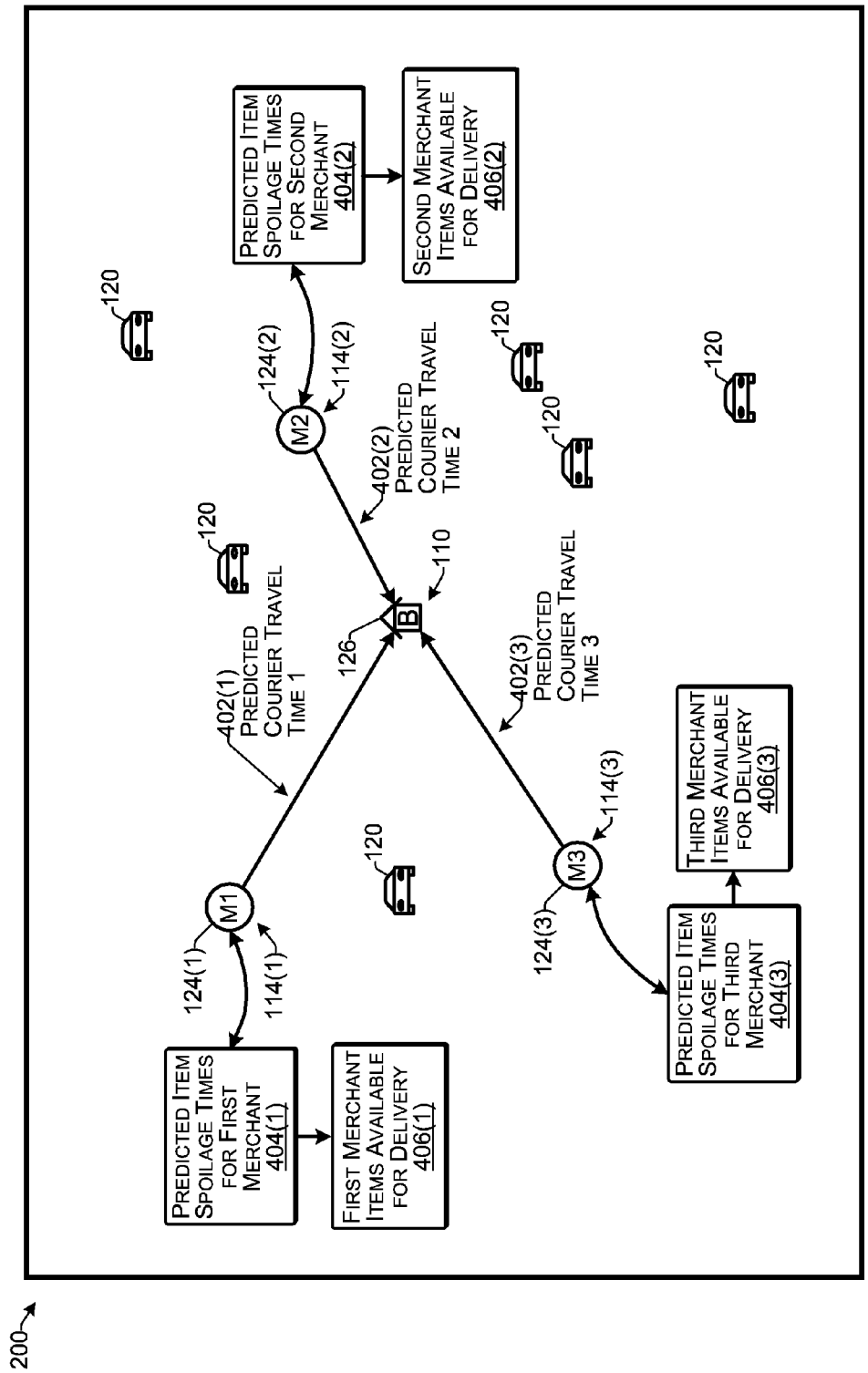
FIG. 4 illustrates example variable delivery zones determined from a buyer's delivery location according to some implementations.

FIG. 4 illustrates an example of determining variable delivery zones determined based on the buyer's delivery location 126 according to some implementations. In this example, rather than determining entire delivery zones around each merchant as in the previous example, delivery zones are determined based on the delivery location 126 of the buyer and a delivery time interval. The service computing device (or the buyer device in some examples) may determine, based at least in part on local conditions for the delivery time interval, respective predicted courier travel times 402 from each merchant pickup location 124 to the delivery location 126. Accordingly, for the delivery time interval, the service computing device may determine a first predicted courier travel time 402(1) for a courier 120 to travel from the pickup location 124(1) of the first merchant 114(1) to the buyer delivery location 126; a second predicted courier travel time 402(2) for a courier 120 to travel from the pickup location 124(2) of the second merchant 114(2) to the buyer delivery location 126; and a third predicted courier travel time 402(3) for a courier 120 to travel from the pickup location 124(3) of the third merchant 114(3) to the buyer delivery location 126.

Based on the predicted courier travel times 402, the service computing device may determine or access predicted item spoilage times 404 for each merchant, compare the predicted item spoilage times 404 the respective predicted courier travel times 402, and determine items 406 available for delivery, if any, from each of the merchants 114. Thus, for the first merchant 114(1), the service computing device may compare the first predicted courier travel time 402(1) with the predicted item spoilage times 404(1) for the first merchant and, based on the comparison, may determine first merchant items or categories of items 406(1) that are available for delivery to the delivery location 126. Similarly, for the second merchant 114(1), the service computing device may compare the second predicted courier travel time 402 (2) with the predicted item spoilage times 404(2) for the second merchant and, based on the comparison, may determine second merchant items or categories of items 406(2) that are available for delivery to the delivery location 126. Similarly, for the third merchant 114(3), the service computing device may compare the third predicted courier travel time 402(3) with the predicted item spoilage times 404(3) for the third merchant and, based on the comparison, may determine third merchant items or categories of items 406(3) that are available for delivery to the delivery location 126.

As one example, suppose that the third merchant 114(3) offers salads included in a first category of items, with a predicted spoilage time of one hour, and further offers French fries in a second category of items with a predicted spoilage time of 20 minutes. Further, suppose that the predicted courier travel time 402(3) for a courier to travel from the third merchant pickup location 114(3) to the delivery location is predicted to be 25 minutes for the delivery time interval. Consequently, the items available for delivery to the delivery location 126 from the third merchant 114(3) include the salads of third merchant, but do not include the French fries of the third merchant 114(3).

The service computing device may send, to the buyer device, item information for the items 406 having predicted spoilage times 404 greater than the predicted courier travel times 402. The buyer device may present this information to the buyer in a GUI on the buyer device. Accordingly, the buyer may browse through the items currently available for delivery to make a selection. Additionally, in some examples, the GUI on the buyer device may present information about merchants or items that are not available for a selected time, but may become available at a further time. Further, in some examples, the buyer application on the buyer device may perform the determination of the predicted courier travel times 402 and/or the comparing the predicted courier travel times 402 with the predicted spoilage times 404 to determine the respective merchant items available for delivery 406.

Figure 5:
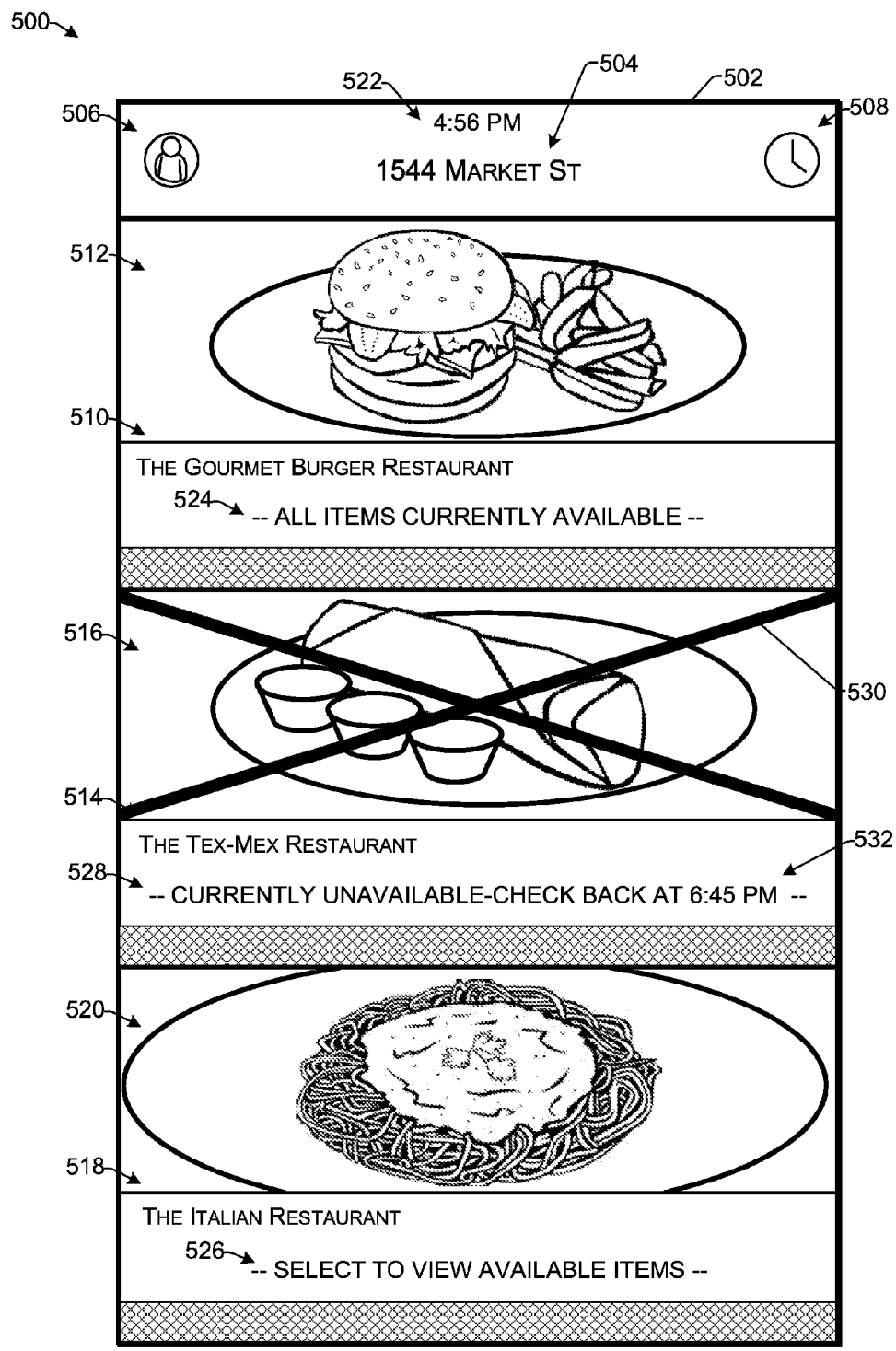
FIG. 5 illustrates an example graphic user interface for presentation on a buyer device according to some implementations.

FIG. 5 illustrates an example GUI 500 presenting merchant information based on variable delivery zones on a display 502 associated with the buyer device 132 according to some implementations. The GUI 500 presents information for a plurality of merchants to enable a buyer to use the buyer device 132 to place an order with one or more of the merchants. The GUI 500 includes an indicated delivery location 504, such as an address to which the buyer's order is to be delivered. In some examples, the delivery location 504 may be determined by the buyer application based on a current location of the buyer device 132, as indicated, e.g., by one or more location sensors included in the buyer device 132. For example, the current location may be determined from GPS information provided by an onboard GPS receiver, and/or from wireless access point information, cell tower information, or the like, determined through one or more communication interfaces, and/or through various other techniques.

In some examples, the delivery location 504 may be entered manually by the buyer, may have been previously used by the buyer, and/or may be a default location that may be changed by the buyer through interaction of the buyer with the GUI 500. For instance, suppose that when placing the order, the buyer is at work, but is planning to go home to receive the order. The buyer may specify the delivery location 504 to be the home address of the buyer even though the buyer is not currently near the home address. As mentioned above, in some examples, the availability of various merchants, and the items offered by the merchants, may change based on the indicated delivery location 504. Accordingly, in some cases, the buyer application may determine the indicated delivery location prior to presentation of the merchant and item information.

The GUI 500 further includes a user icon 506 that the buyer may select to change an account associated with the order, or to access other account information of the buyer's account. Additionally, the GUI 500 includes a clock icon 508 that the buyer may select to change a time associated with the order, such as for scheduling the order to be delivered at a later time, e.g., later in the day, on a future date, or the like. As mentioned above, in some examples, the availability of the merchants and the different items offered by the merchants may be varied based on the time of day and day of the week for desired delivery indicated by the buyer prior to presentation of the merchant and item information.

In the illustrated example, the GUI 500 presents merchant information about three merchants, including a name 510 and a representative image 512 associated with a first merchant "The Gourmet Burger Restaurant", a name 514 and a representative image 516 associated with a second merchant, "The Tex-Mex Restaurant", and a name 518 and a representative image 520 associated with a third merchant, "The Italian Restaurant". Further, while information about three merchants is presented in this example, information about other merchants, if available to provide items for delivery, may be presented in the GUI 500 by the buyer scrolling or otherwise traversing through the merchant information presented in the GUI 500.

In the GUI 500 of this example, the current time 522 is indicated to be 4:56 PM. By default, the buyer application may be configured to assume that the buyer wishes to order an item for delivery as soon as possible, rather than at some point later in the day or later in the week. Accordingly, based on this assumption, the GUI 500 may default to presenting merchant and item availability based on the buyer wanting to order now and have the order enqueued for preparation and delivery as soon as the order is placed. As mentioned above, if the buyer alternatively wishes to have the order prepared and delivered at a later time, the buyer may specify a later delivery time such as through the selection of the icon 508.

Based on the assumption that the buyer would like to order an item now, the buyer application may obtain and present information for the current time period, e.g., as if the buyer wants the order placed immediately, or within the next half hour, hour, etc. Thus, the user interface 500 may present merchant and item information for merchants having delivery zones that currently include the delivery location 504 of the buyer. For instance, since the time is currently 4:56 PM, rush hour traffic may be causing substantial increases in courier travel times between some merchant pickup locations and some delivery locations. In this example, as indicated at 524 and 526, respectively, The Gourmet Burger Restaurant and The Italian Restaurant both currently have at least some items available for delivery to the delivery location 504, while all the items of The Tex-Mex Restaurant may be unavailable, as indicated at 528. For instance, The Tex-Mex Restaurant may correspond to the first merchant 114(1) in FIGS. 2-4, The Gourmet Burger Restaurant may correspond to the second merchant 114(2) in FIGS. 2-4, and The Italian Restaurant may correspond to the third merchant 114(3) in FIGS. 2-4.

The Tex-Mex Restaurant is indicated in this example to be currently unavailable for receiving delivery orders from the indicated delivery location 504. For instance, as discussed above, the indicated delivery location 504 may be outside of the delivery zone currently associated with The Tex-Mex Restaurant or, in other words, as discussed in FIG. 4, the predicted courier travel time from the pickup location of The Tex-Mex Restaurant to the delivery location 504 exceeds the predicted spoilage times of the items available from The Tex-Mex Restaurant. If the buyer were to change the indicated delivery location 504 to a location closer to The Tex-Mex Restaurant, the GUI 500 may be changed to cause The Tex-Mex Restaurant to become selectable for placing an order, but one or more other merchants may possibly become unavailable for placing an order during the current time period, depending on the new delivery location relative to the one or more other merchants.

In some examples, in addition to the text 528, the GUI 500 may present a graphic element or other graphic indication 530 to indicate that The Tex-Mex Restaurant is currently unavailable, such as a strike-through, fading or graying-out information about The Tex-Mex Restaurant, or the like. Furthermore, as indicated at 532, the GUI 500 may indicate that The Tex-Mex Restaurant is expected to become available at a future point in time, and may encourage the buyer to check back at that time if the buyer would like to order from The Tex-Mex Restaurant. For instance, if the delivery location is predicted to never be within the delivery zone associated with The Tex-Mex Restaurant, then the GUI 500 may be configured to not present any information about The Tex-Mex Restaurant. On the other hand, since the delivery location 504 is at least sometimes within the delivery zone associated with The Tex-Mex Restaurant, as discussed above with respect to FIG. 3, information about The Tex-Mex Restaurant may be presented in the GUI 500 to indicate to the buyer that it is possible to place orders with this merchant at least some of the time.

Figure 6:
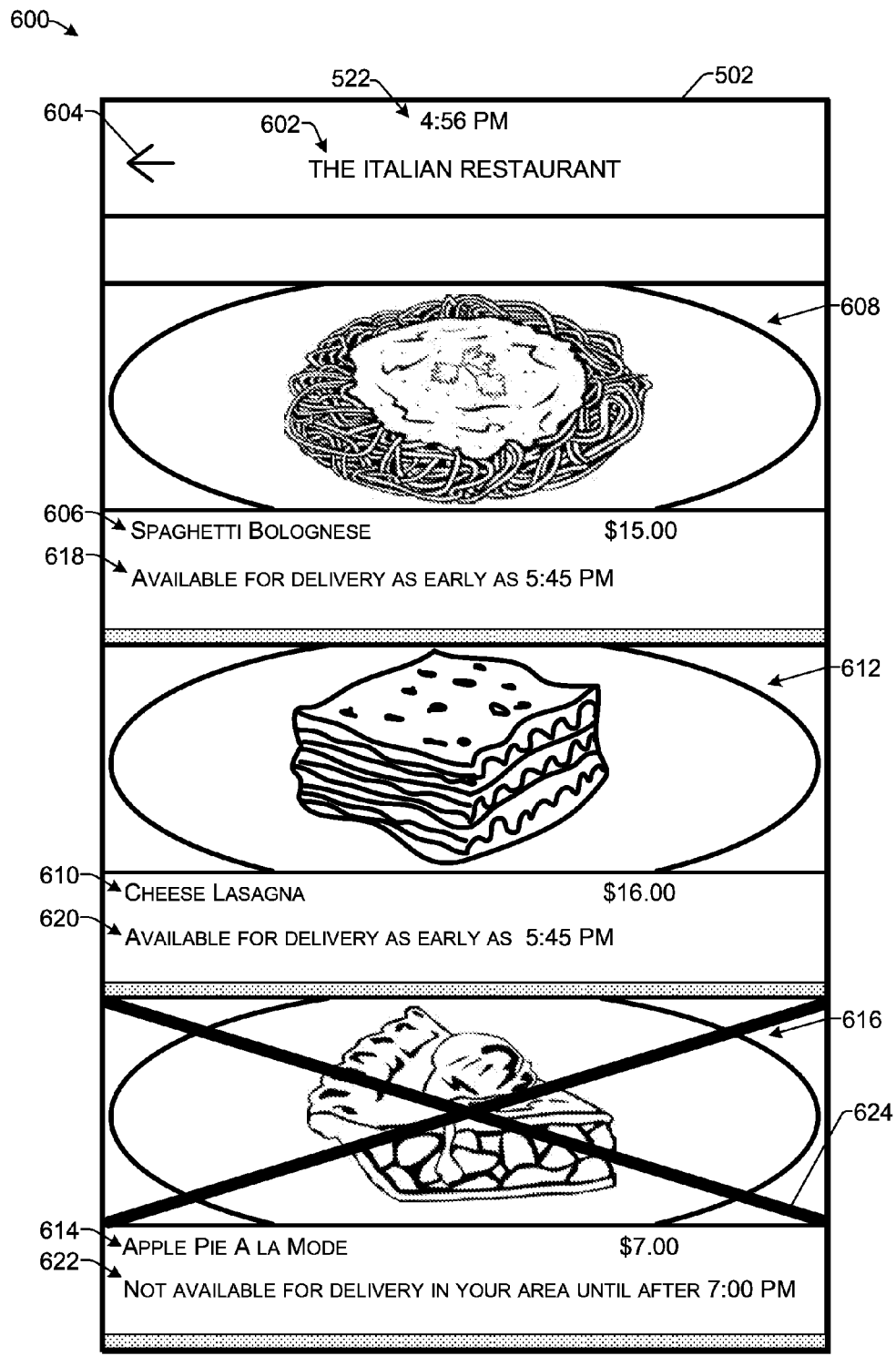
FIG. 6 illustrates an example graphic user interface for presentation on a buyer device according to some implementations.

FIG. 6 illustrates an example GUI 600 that may be presented on the display 502, such as in the case that the buyer selects The Italian Restaurant to browse items available from this merchant. The GUI 600 may present the name 602 of the selected merchant and, as indicated at 604, may provide a virtual control to enable the buyer to go back to the GUI 500 to select a different merchant, if desired. The GUI 600 may further present a plurality of items available from the selected merchant, such as a name 606 and a representative image 608 of a first item, "Spaghetti Bolognese", a name 610 and representative image 612 of a second item, "Cheese Lasagna", and a name 614 and representative image 616 of a third item, "Apple Pie À la Mode". Further, while three items are illustrated in the GUI 600 in this example, numerous other items may be available from the selected merchant and may be viewed, e.g., by scrolling or otherwise traversing through the GUI 600.

In the illustrated example, the Spaghetti Bolognese and the Cheese Lasagna are available for ordering now, while the Apple Pie À la Mode is not currently available for ordering. For example, suppose that the Spaghetti Bolognese and the Cheese Lasagna are categorized in a first category of items offered by the merchant, and have a similar spoilage time predicted to be 25 minutes while the Apple Pie À la Mode is categorized in a second category of items offered by the merchant, and has a spoilage time predicted to be 15 minutes.

Furthermore, suppose that with local conditions taken into consideration, such as current traffic, weather, and local events, the predicted courier travel time from the pickup location of The Italian Restaurant to the delivery location specified by the buyer is predicted to be 21 minutes. Consequently, the delivery location is treated as being outside of the delivery zone of The Italian Restaurant with regards to the Apple Pie À la Mode, but the delivery location is treated as being inside the delivery zone of The Italian Restaurant with regards to the Spaghetti Bolognese and the Cheese Lasagna. Consequently, as indicated at 618 and 620, respectively, the Spaghetti Bolognese and the Cheese Lasagna are indicated to be available for immediate delivery, while as indicated at 622, the Apple Pie À la Mode is indicated to not be available for delivery until a future time, which in this example is after 7:00 PM. Further, to visually indicate that the Apple Pie À la Mode is not available for selection at this time, a graphic indicator 624 may be included in addition to the text 622 such as by overlaying a strike-through, fading or graying-out information about the Apple Pie À la Mode, or the like.

As one example, suppose that the current time is 4:56 PM and the buyer is using the buyer application on the buyer device 132 to order dinner. The buyer application may receive the merchant and/or item information from the zone determination module on the service computing device, and may present the merchant information and the respective items available from each merchant. For instance, if the buyer wants to order the Cheeses Lasagna, elects to have the order immediately enqueued with the merchant 602, and delivered as soon as the order is ready, e.g., by 5:45 PM in this example, the buyer may select the Cheese Lasagna and proceed with placing the order. In some examples, to place an order, the buyer may select the name or the representation of one or more of the items, such as by tapping on a particular item representation or by tapping on a zone associated with the particular item. The buyer may then subsequently be presented with a pop-up window, a separate GUI, or the like (not shown in FIG. 6), asking the buyer to select or confirm a delivery time interval and price for the selected item. Accordingly, the buyer may select any of the available items to be delivered within the desired delivery interval, e.g., by 5:45 PM in this example. Alternatively, if the buyer also wants the Apple Pie À la Mode and can wait until after 7:00 PM to have the order delivered, the buyer may change the desired delivery time interval, and may select the Apple Pie À la Mode and the Cheese Lasagna for delivery at the later delivery time interval.

Alternatively, in some examples, rather than presenting the buyer with an indication of a specific time when the unavailable item (or unavailable merchant) may become available, the GUI 600 may merely indicate that the unavailable item (or merchant) may be available for ordering at a later time, and the GUI 600 may provide an option for the buyer to request a notification. Thus, the buyer may request that the service notify the buyer when a particular item, or a particular merchant, becomes available to be selected for a delivery to the indicated delivery location. When the traffic and/or other local conditions have changed sufficiently, so that a predicted spoilage time is expected to be greater than a predicted courier travel time, the service may notify the buyer, such as by sending an in-application message, an SMS (short messaging service) text message, an email, or other electronic communication to the buyer device. For instance, the service may project that this change in local condition will occur at a certain time, and may notify that buyer a threshold amount of time earlier (such as based on a predicted preparation time for an item) so that the buyer may place the order, and the order will be ready for pickup by a courier by the time the traffic or other local condition has changed as predicted.

Figure 7:
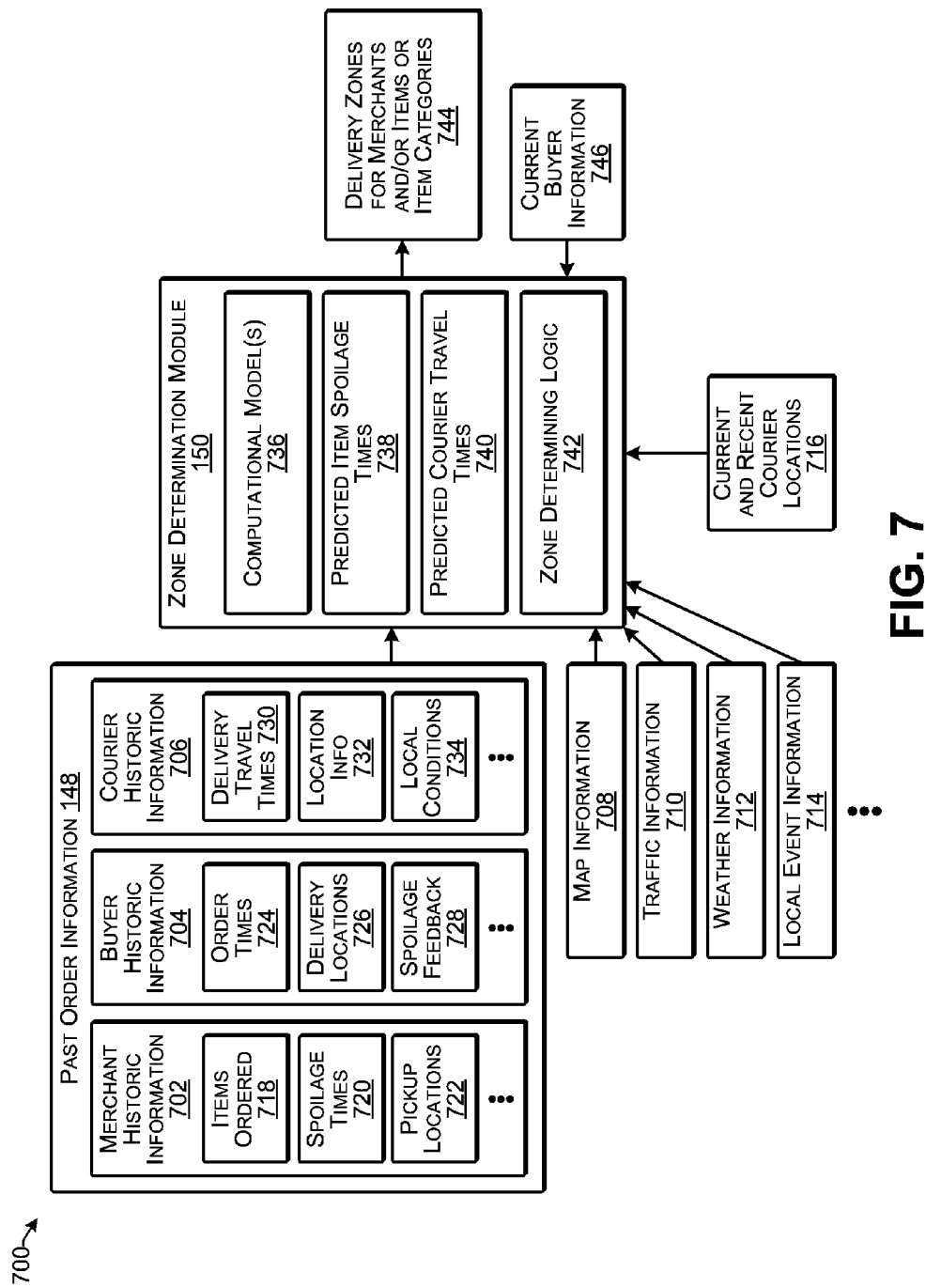
FIG. 7 is a block diagram illustrating an example framework for determining delivery zones according to some implementations.

FIG. 7 is a conceptual block diagram 700 illustrating an example of determining information that may be used for determining variable delivery zones according to some implementations. In this example, the zone determination module 150 may receive the past order information 148 including merchant historic information 702, buyer historic information 704, and courier historic information 706. In addition, the zone determination module 150 may receive map information 708, traffic information 710, weather information 712, local event information 714, and/or current and recent courier location information 716. Further, while several types of information that may be used by the zone determination module 150 are illustrated, in other examples, other or additional types of information may be used by the zone determination module 150, as discussed above, and/or as will be apparent to those of skill in the art having the benefit of the disclosure herein.

The merchant historic information 702 includes historic order information related to the merchants, e.g., various types of information related to past orders filled by the merchants that participate in the service of the service provider 104. For instance, the merchant historic information 702 may include items ordered 718 from each merchant at particular times on particular days of the week, particular dates, and the like. Further, the merchant historic information 702 may include the spoilage times 720 for each item offered by each merchant and the pickup locations 722 associated with each merchant. As one example, each merchant may specify an expected spoilage time for each item or each category of item offered by the merchant. In some cases, the merchants may categorize items into spoilage-time-based item categories, such that items having a similar spoilage times are categorized into the same item category. In other examples, the service provider may determine item spoilage times and/or item categories based on empirical information, which may include buyer and/or courier feedback, as discussed additionally below.

Additionally, the buyer historic information 704 includes historic order information related to the buyers. Examples of buyer historic information 704 may include order times 724, e.g., a time of day, day of the week, and date on which each order was placed. The buyer historic information 704 may further include delivery locations 726 to which each order was delivered, and spoilage feedback 728. For instance, as discussed additionally below, feedback may be received from the buyer devices (and/or from the courier devices) that may indicate if one or more items from an order spoiled prior to delivery to the buyer. This feedback may be used to adjust or otherwise change the predicted spoilage times for particular items or categories of items offered by particular merchants.

Further, the courier historic information 706 includes historic order information related to the couriers. For example, the courier historic information 706 may include delivery travel times 730, which may indicate the time that an order was picked up and the time that the order was delivered, e.g., how long it took each courier to deliver each order after picking up the order from the merchant's pickup location. Additionally, location information 732 may include locations of individual couriers at different times of day, for different days of the week in different parts of the service region. For instance, the courier location information 732 may indicate speeds at which couriers are able to travel on different streets in the service region at different times of day, thereby providing an indication of traffic information and an indication of predicted delivery travel times at different times of day and different days of the week. The location information 732 may further indicate how far each courier had to travel after picking up each order to make delivery of the order.

In addition, the courier historic information 706 may include local conditions 734, such as traffic conditions and weather conditions when particular orders were fulfilled, information regarding any local events taking place within the service region when the orders were fulfilled, and the like. Furthermore, the merchant historic information 702, the buyer historic information 704, and the courier historic information 706 may include additional types of information, with the foregoing being merely several examples of the types of information that may be used by the zone determination module 150.

In some implementations, the zone determination module 150 may employ one or more computational models 736 for determining predicted item spoilage times 738 for various different items offered by various different merchants. A spoilage time may be the time between when an ordered item is ready for pickup and when the ordered item is considered to be of degraded quality, e.g., cold, soggy, melted, wilted, oxidized, or otherwise less palatable than would be normally expected by the buyer. For instance, the zone determination module 150 may determine the predicted spoilage times 738 of various different items based in part on the spoilage times 720 indicated by the merchants, and further based in part on the predicted weather for the service region over an upcoming period of time. For instance, the merchants may have control over the packaging used to package the items for delivery, and the merchants may have a reasonable idea of respective spoilage times for their items and packaging based on experience. Accordingly, the spoilage times 720 provided by the merchants may provide a baseline for the computational model 736.

Further, the local weather may have an effect on spoilage times, such as on unusually hot days, unusually cold days, rainy days, and the like, that may not have been taken into consideration by the merchants when estimating spoilage times for their items. For example, on a very hot day, items that are served hot may have an extended spoilage time, while items that are served cold, may have a decreased spoilage time, and vice versa on unusually cold days. As another example, rainy days and very humid days may decrease the spoilage time for certain items such as items that are expected to be crisp or crunchy. Accordingly, the weather information 712 may be obtained from an online source or other suitable source, and may be used when determining the predicted spoilage times 738.

Spoilage feedback 728 from the buyers and/or from the couriers regarding actual spoilage may also be taken into consideration when predicting spoilage times 738 for particular items. For instance, suppose that a particular item, such as French fries from The Gourmet Burger Restaurant discussed above, have been delivered to a large number of buyers within the service region. Furthermore, suppose that a threshold number of complaints or other negative feedback have been received regarding the quality of the French fries from this particular merchant. As one example, the buyer application on the buyer device may provide the buyer with the opportunity to provide feedback on the received order. For instance, the feedback may be transmitted automatically by the buyer application to the service computing device.

The service computing device may apply parsing and text recognition for determining, from particular orders, the items to which the negative feedback applies. For instance, words such as "soggy", "cold", "gross", etc., when included in the same comment as "fries" may indicate that the French fries were received in an unsatisfactory condition. Additionally, in some cases of spoilage, the buyer may request a refund, or may request a replacement item, which may also be an indication of spoilage of the replaced item. Consequently, when a threshold level of negative feedback has been received for an item or a category of items from a particular merchant, the predicted spoilage times for the item or items may be adjusted to be a shorter length of time. As another example, if no negative feedback related to spoilage is received for particular items or particular categories of items from a particular merchant, the predicted spoilage times 738 for the item or items may be gradually increased until such a time as negative feedback related to spoilage is received, and the spoilage times may then be lowered back down slightly.

As still another example, the couriers may also provide feedback for individual orders, such as regarding the condition of the items at the time of delivery, e.g., by viewing the items or otherwise inspecting the items during delivery, by asking the buyer if the items are in satisfactory condition, or the like. Accordingly, the courier application on the courier device may provide the couriers with one or more GUIs (not shown in FIG. 7) to enable the couriers to provide feedback on the condition of the particular items for a particular delivery order at the time of delivery. Furthermore, in some examples the couriers may be provided with an incentive to provide the feedback, such as for additional compensation, points towards courier benefits, rewards, prizes, or other types of incentives.

Additionally, in some cases, the items offered by each merchant may be categorized into respective item categories based in part on the predicted spoilage times 738 and based in part on whether the items are hot items, cold items, or the like. For example, lasagna, spaghetti, baked ziti, ravioli, etc., may be classified into the same item category since these are hot items that are expected to behave similarly during spoilage and may have approximately the same spoilage times. Similarly, salads, fresh fruit, and the like, may be categorized into the same item category since these items may be chilled and may have approximately the same spoilage times in some cases. The use of item categories may simplify the merchant and item information that is provided to the buyer device. As an example, such item categories may be determined according to a 5-minute, 10-minute, 15-minute granularity, or any other suitable granularity. For instance, a first item category may be for hot items that are predicted to spoil within 15 minutes of preparation, a second category may be for hot items predicted to spoil within 25 minutes of preparation, a third item category may be for cold items that are predicted to spoil within 45 minutes of preparation, and so forth.

Furthermore, in some examples, the zone determination module 150 may employ the one or more computational models 736 for determining predicted courier travel times 740 between merchant pickup locations and potential delivery locations and/or a particular delivery location specified by a buyer, such as for a particular day during a particular delivery time interval. The predicted courier travel times 738 may be based in part on the courier historic information 706, such as based on courier location information 732 that indicates courier movement within the service region at particular times, on particular days, on particular dates, during particular types of weather, or while other local conditions 734 are in effect.

The predicted courier travel times may further be based at least in part on current or future information, such as weather forecast information 712, and local event information 714. As one example, based at least in part on the one or more computational models 736, the zone determination module 150 may determine a confidence score for a prediction of how long it will take a courier to travel from a first point to a second point within the service region at a particular time on a particular day of the week. The current and recent courier location information 716 may also be considered when determining the predicted courier travel times 740. For example, recent courier movement, or lack thereof, may indicate unexpectedly heavy traffic. Additionally, in some examples, traffic information 710 from an online map service, such as may be obtained from a webserver or other network source, may also be used or taken into consideration by the computational model when determining the predicted courier travel times.

As one example, the computational model(s) 736 may include one or more trained statistical models that account for numerous pieces of information included in the past order information 148, as well as current information, such as time, day and date information, traffic information 710, weather information 712, local event information 714, and the like. In some cases, the one or more statistical models may be initially trained using a set of training data, checked for accuracy, and then used for predicting at least one of spoilage times or courier travel times based on a confidence score exceeding a specified threshold of confidence. The statistical model(s) may be periodically updated and retrained based on new training data to keep the model(s) up to date and accurate. Examples of suitable statistical models that may be incorporated into the computational model(s) 736 herein may include regression models, such as linear and nonlinear regression models, and stochastic models, such as Markov models, hidden Markov models, and so forth.

Additionally, while the computational model 736 has been described as one example of a technique for predicting spoilage times 738 and/or predicted courier travel times 740, numerous other techniques, algorithms, decision-making rules, and the like, may additionally or alternatively be used for determining this information. Accordingly, implementations herein are not limited to use of a computational model 736.

After the zone determination module 150 has determined, for an upcoming period of time, predicted spoilage times 738 and/or predicted courier travel times 740, the zone determination module 150 may apply zone determining logic 742 to these predictions, such as to generate delivery zones 744 for merchants and/or for items or categories of items offered by the merchants, such as for particular times and days. In some instances, the zone determining logic 742 may also receive the current buyer information 746, such as an indicated delivery location and/or an indicated desired delivery time, and may determine the delivery zones 744 based on this information as discussed above with respect to FIG. 4.

In some examples, the zone determining logic 742 may include one or more algorithms, one or more computational models, a plurality of decision-making rules, or the like, configured to determine delivery zones based on the predicted item spoilage times 738 and the predicted courier travel times 740. For instance, the zone determining logic 742 may employ the various different considerations discussed above to determine the delivery zones based on the predicted courier travel times 740 from a particular merchant pickup location to potential delivery locations being less than the predicted spoilage times for particular items or categories of items. The predicted courier travel time may be determined based on map information, current or predicted traffic conditions, as well as weather conditions, local events, street closures, construction projects, and so forth. Thus, the delivery zone of a particular merchant and particular items offered by the merchant may expand and contract with changes in traffic conditions, weather, and/or other local conditions. For example, a particular merchant or item may have a large delivery zone when traffic is light, but the delivery zone may shrink substantially during rush hour.

In some cases, the delivery zones for respective merchants and/or items may be calculated in advance, such as discussed above with respect to FIGS. 2 and 3. For instance, each delivery zone may be determined based on a radius, oval, or other suitable shape around a pickup location of a respective merchant based on predicted courier travel times to the perimeter of the delivery zone. If the spoilage time for a particular item or category of items is 25 minutes, then the perimeter of the delivery zone may generally be 25 minutes of predicted courier travel time in every direction from the pickup location of the merchant. In some cases, each delivery zone may be determined more precisely as a respective polygon or partial polygon around each pickup location, such as with the outer edges of the polygon being aligned with individual streets at the perimeter of the respective delivery zone.

In addition, in some cases, the respective delivery zones may be determined based at least in part on a cost function that takes into account tolls, actual spoilage feedback, and predicted courier travel time. Thus, the zone determining logic 742 may determine the boundary of the delivery zone at a plurality of points at which the cost of delivery becomes prohibitive. For instance, a particular delivery zone may be determined based on a probability of spoilage based in part on the spoilage feedback 728, e.g., if there is a 90 percent or greater probability that an item can be delivered to a location at a particular time without spoilage, then the location may be included in the delivery zone for that item. This determination can be refined based on the spoilage feedback 728 from the buyers and/or the couriers. Furthermore, the cost function may treat a toll as another cost of the order, which would tend to make a delivery requiring payment of a toll less likely as the cost of the toll increases relative to the cost of the order. Additionally, or alternatively, tolls or geological features, such as bodies of water without nearby bridges, may be taken into consideration, and may result in hard cutoffs that would exclude delivery across the tolls or across other geological features that might not be easily traversed.

In some examples, the service provider may receive, from a courier device, an indication of a time when the courier picks up an order from a pickup location and a time at which the courier delivers the order to the delivery location. The service may adjust the delivery zones and/or the computational model 736 and/or the zone determining logic 742 for determining the delivery zones based on the location information and other feedback received from the courier devices over a period of time. For example, if the actual courier travel time is different from that predicted by the computational model 736, the computational model 736 may be modified to predict courier travel times more accurately. As another example, if delivery to a particular address typically requires an additional 5-10 minutes between when the courier arrives at the location and when the courier indicates that the delivery is complete, the address may correspond to a high rise building, or the like, and the additional delivery time required may be taken into consideration in the future when determining whether the particular building is included in a particular delivery zone.

Additionally, in some implementations, the determination of respective delivery zones 744 may be performed by the buyer application on the buyer device, rather than on the service computing device of the service provider. For example, the buyer application on the buyer device may keep track of the location of the buyer device using an onboard GPS receiver or other location sensor. The buyer application may periodically update the item delivery zones and/or merchant delivery zones based on received information, such as traffic information or weather information. For example, the buyer application on the buyer device include at least a portion of the zone determination module 150 and may determine at least one of predicted courier travel times 740, predicted spoilage times 736, and/or delivery zones 744, based on information received from the service computing device and other sources of information.

Furthermore, the delivery zones 744 may change day-to-day and week-to-week based on current weather conditions, local events, seasonal traffic patterns, and the like. As one example, the zone determination module 150 may use weather forecasts and other weather information 112, at least in part, to determine delivery zones for upcoming days for which weather forecasts are available. Similarly, local event information 714 about local events that may cause street closures or may otherwise affect the traffic in the service region can also be taken into consideration when predicting courier travel times used for determining the delivery zones.

In some examples, the courier application may automatically send courier location information 716 to the zone determination module on a periodic basis while the associated courier is on-duty or otherwise active. Alternatively, the zone determination module 150 may periodically ping the courier devices of active couriers to determine the couriers' current locations. Each courier device may include one or more location sensors, such as a GPS receiver, or communication interfaces that can determine (e.g., from cell towers or wireless access points) a geographic location of the courier device.

Figure 8:
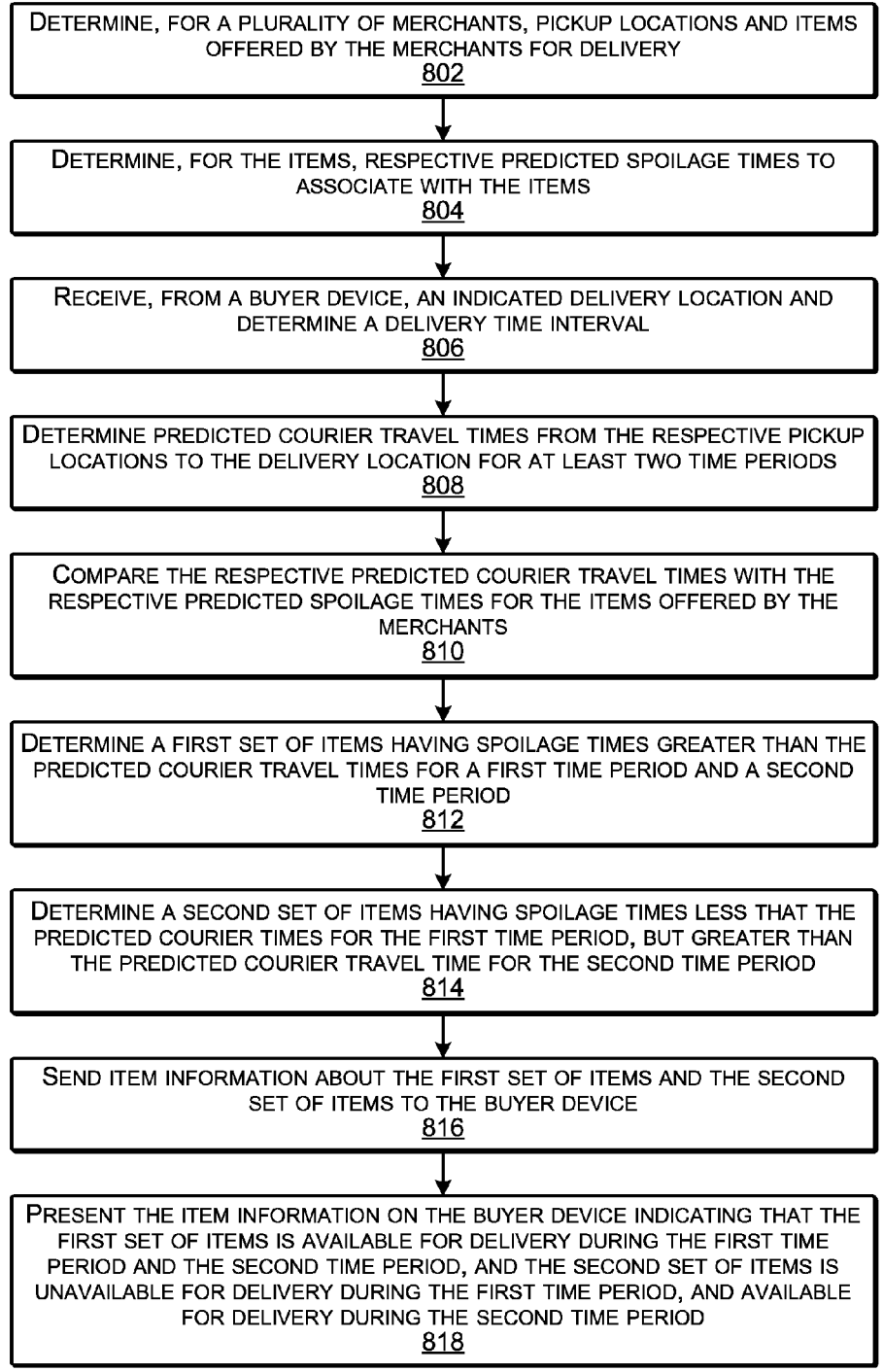
FIG. 8 is a flow diagram illustrating an example process for determining items available for delivery to a buyer location according to some implementations.
Figure 9:
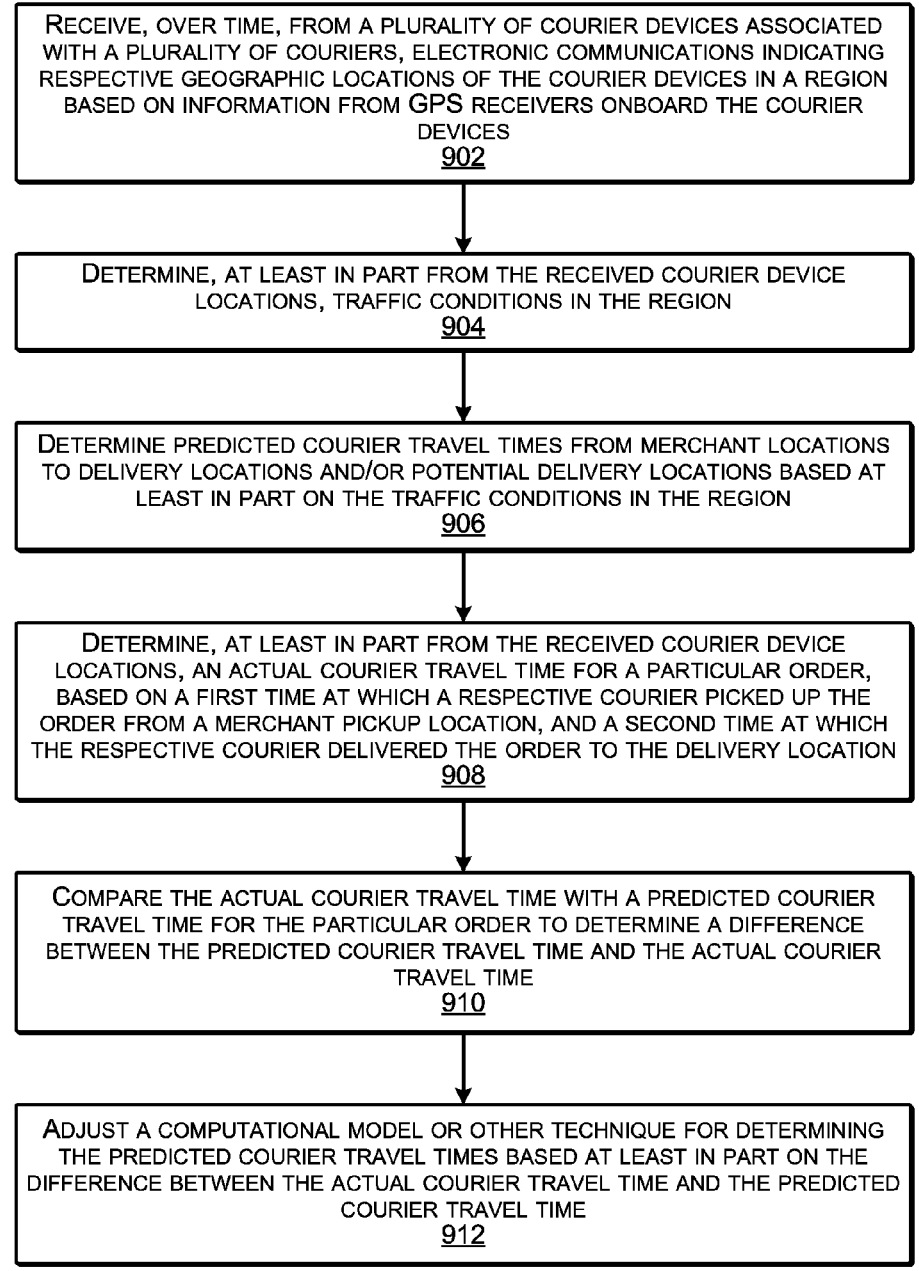
FIG. 9 is a flow diagram illustrating an example process for determining predicted courier travel times based in part on courier movement according to some implementations.

FIGS. 8 and 9 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems and devices described in the examples herein, although the processes may be implemented in a wide variety of other environments, systems and devices.

FIG. 8 is a flow diagram illustrating an example process 800 for determining item information based on variable delivery zones according to some implementations. In some examples, the process may be executed in part by the service computing device 102 and in part by the buyer device 132.

At 802, the buyer device, may determine, for a plurality of merchants, pickup locations and items offered by the merchants for delivery. For example, each merchant may be associated with a merchant pickup location and at least one item that is offered for delivery.

At 804, the service computing device may determine, for the items, respective predicted spoilage times to associate with the items. For instance, the spoilage times may be predicted based at least in part on spoilage times provided by the respective merchants. The predicted spoilage times may further be predicted based at least in part on feedback received from a plurality of buyer devices associated with a plurality of different buyers and/or feedback received from courier devices associated with respective couriers. The predicted spoilage times may further be predicated based at least in part on predicted weather conditions for the region.

At 806, the service computing device may receive, from a buyer device, an indicated delivery location and may determine a delivery time interval. For example, the deliver time interval may be determined based on the time at which the communication of the delivery location is received from the buyer device, or may be determined based on time information received from the buyer device, such as in the case that the buyer would like delivery at a later time or on a later day. In some examples, the indicated delivery location may be based at least in part on a geographic location of the buyer device determined through information from a GPS receiver included in the buyer device. In other examples, the indicated delivery location may be a default location, may be entered manually by the buyer, and/or may be a previously used location.

At 808, the service computing device may determine predicted courier travel times from the respective pickup locations to the delivery location for a plurality of time periods. For instance, the predicted courier travel times may be determined for a current time period based on current traffic, current weather, etc. Further, the predicted courier travel times may be determined for one or more later time periods, such as based on predicted traffic, predicted weather, predicted local events, and so forth. As discussed above with respect to FIG. 7, past order information and other information may be considered with determining the predicted courier travel times.

At 810, the service computing device may compare the respective predicted courier travel times with the respective predicted spoilage times for the items offered by the merchants.

At 812, the service computing device may determine a first set of items having spoilage times greater than the predicted courier travel times for a first time period and a second time period. For instance, these items may be available for delivery to a delivery location within the predicted travel time of the corresponding merchant pickup location.

At 814, the service computing device may determine a second set of items having spoilage times less that the predicted courier times for the first time period, but greater than the predicted courier travel time for the second time period. For instance, these items may be presented in the GUI on the buyer device, but may be indicated to be unavailable for the first time period, and available during the second time period.

At 816, the service computing device may send item information about the first set of items and the second set of items to the buyer device. For example, the service computing device may send the merchant and item information to the buyer device in response to receiving the indicated delivery location and based on a determined delivery time interval. In other examples, the buyer application on the buyer device may determine the merchant and item information based information received from the service computing device and/or other sources.

At 818, the buyer device may present the item information on the buyer device indicating that the first set of items is available for delivery during the first time period and the second time period, and the second set of item is unavailable for delivery during the first time period and available for delivery during the second time period. For example, as discussed above with respect to FIG. 6, some items may be able to be selected for delivery during a first time period, while other items may not be available until a second time period. Further, a third set of one or more items offered by merchants that have respective spoilage times less than the predicted courier travel time regardless of the delivery time interval might not be presented in the GUI of the buyer device, even in a crossed out or grayed-out condition.

FIG. 9 is a flow diagram illustrating an example process 900 for determining traffic information according to some implementations. In some examples, the process may be executed by the service computing device 102 or by another suitable computing device.

At 902, the computing device may receive, over time, from a plurality of courier devices associated with a plurality of couriers, electronic communications indicating respective geographic locations of the courier devices in a region based on information from GPS receivers onboard the courier devices At 904, the computing device may determine, at least in part from the received courier device locations, traffic conditions in the region.

At 906, the computing device may determine predicted courier travel times from merchant locations to delivery locations and/or to potential delivery locations based at least in part on the traffic conditions in the region.

At 908, the computing device may determine, at least in part from the received courier device locations, an actual courier travel time for a particular order, based on a first time at which a respective courier picked up the order from a merchant pickup location and a second time at which the respective courier delivered the order to the delivery location.

At 910, the computing device may compare the actual courier travel time with a predicted courier travel time for the particular order to determine a difference between the predicted courier travel time and the actual courier travel time.

At 912, the computing device may adjust a computational model or other technique for determining the predicted courier travel times based at least in part on the difference between the actual courier travel time and the predicted courier travel time.

The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 10:
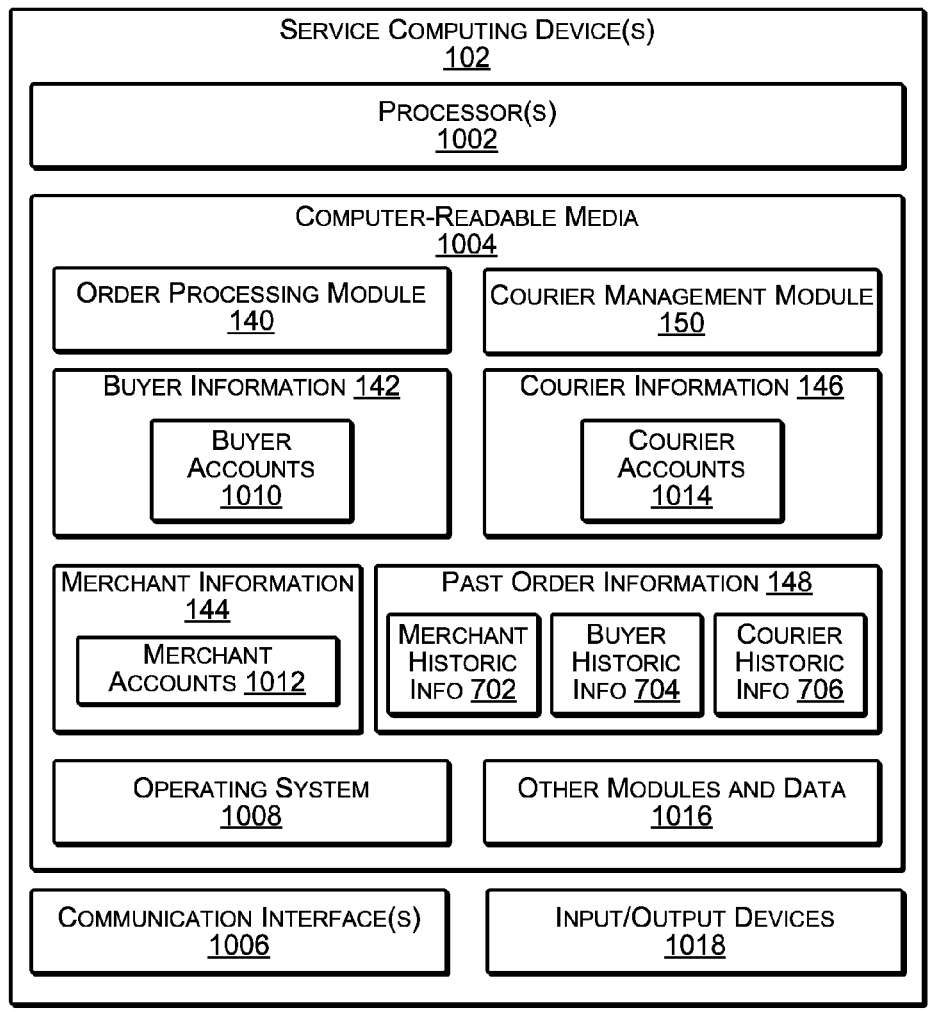
FIG. 10 illustrates select components of one or more example service computing devices according to some implementations.

FIG. 10 illustrates select components of the service computing device 102 that may be used to implement some functionality of the variable delivery zones and order processing services described herein. The service computing device 102 may include one or more servers or other types of computing devices that may be embodied in any number of ways. For instance, in the case of a server, the modules, other functional components, and data may be implemented on a single server, a cluster of servers, a server farm or data center, a cloud-hosted computing service, and so forth, although other computer architectures may additionally or alternatively be used.

Further, while the figures illustrate the components and data of the service computing device 102 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 102 may include one or more processors 1002, one or more computer-readable media 1004, and one or more communication interfaces 1006. Each processor 1002 may be a single processing unit or a number of processing units, and may include single or multiple computing units or multiple processing cores. The processor(s) 1002 can be implemented as one or more microprocessors, microcomputers, microcontrollers, digital signal processors, central processing units, state machines, logic circuitries, and/or any devices that manipulate signals based on operational instructions. For instance, the processor(s) 1002 may be one or more hardware processors and/or logic circuits of any suitable type specifically programmed or configured to execute the algorithms and processes described herein. The processor(s) 1002 can be configured to fetch and execute computer-readable instructions stored in the computer-readable media 1004, which can program the processor(s) 1002 to perform the functions described herein.

The computer-readable media 1004 may include volatile and nonvolatile memory and/or removable and non-removable media implemented in any type of technology for storage of information, such as computer-readable instructions, data structures, program modules, or other data. Such computer-readable media 1004 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 1004 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 1004 may be used to store any number of functional components that are executable by the processors 1002. In many implementations, these functional components comprise instructions or programs that are executable by the processors 1002 and that, when executed, specifically configure the one or more processors 1002 to perform the actions attributed above to the service computing device 102. Functional components stored in the computer-readable media 1004 may include the order processing module 140 and the zone determination module 150. Additional functional components stored in the computer-readable media 1004 may include an operating system 1008 for controlling and managing various functions of the service computing device 102.

In addition, the computer-readable media 1004 may store data used for performing the operations described herein. Thus, the computer-readable media 1004 may store the buyer information 142, including buyer accounts 1010, the merchant information 144, including merchant accounts 1012, and the courier information 146, including courier accounts 1014. Further, the computer-readable media may include the past order information 146, such as the merchant historic information 702, the buyer historic information 704, and the courier historic information 706. The service computing device 102 may also include or maintain other functional components and data not specifically shown in FIG. 10, such as other modules and data 1016, which may include programs, drivers, etc., and the data used or generated by the functional components. Further, the service computing device 102 may include many other logical, programmatic and physical components, of which those described above are merely examples that are related to the discussion herein.

The communication interface(s) 1006 may include one or more interfaces and hardware components for enabling communication with various other devices, such as over the network(s) 106. For example, communication interface(s) 1006 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, and the like, as additionally enumerated elsewhere herein.

The service computing device 102 may further be equipped with various input/output (I/O) devices 1018. Such I/O devices 1018 may include a display, various user interface controls (e.g., buttons, joystick, keyboard, mouse, touch screen, etc.), audio speakers, connection ports and so forth.

Figure 11:
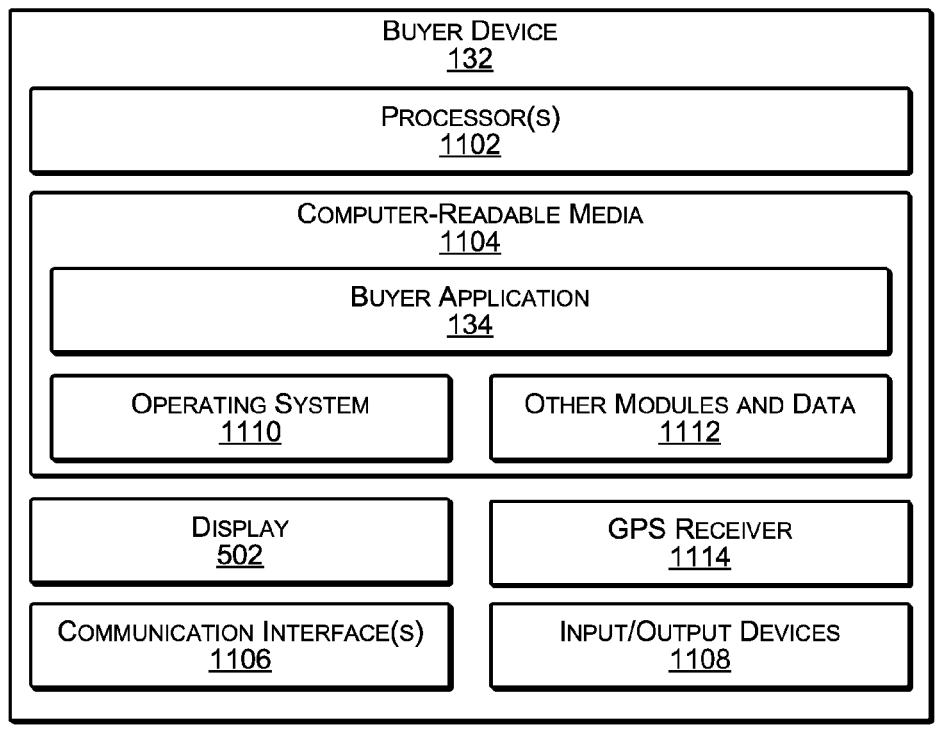
FIG. 11 illustrates select components of an example buyer device according to some implementations.

FIG. 11 illustrates select example components of the buyer device 132 that may implement the functionality described above according to some examples. The buyer device 132 may be any of a number of different types of portable computing devices. Some examples of the buyer device 132 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein. Further, in some examples, the buyer device 132 may be a stationary or semi-stationary computing device, such as a desktop computer or other device with computing capabilities.

In the example of FIG. 11, the buyer device 132 includes components such as at least one processor 1102, one or more computer-readable media 1104, one or more communication interfaces 1106, and one or more input/output (I/O) devices 1108. Each processor 1102 may itself comprise one or more processors or processing cores. For example, the processor 1102 can be implemented as one or more microprocessors, microcomputers, microcontrollers, digital signal processors, central processing units, state machines, logic circuitries, and/or any devices that manipulate signals based on operational instructions. In some cases, the processor 1102 may be one or more hardware processors and/or logic circuits of any suitable type specifically programmed or configured to execute the algorithms and processes described herein. The processor 1102 can be configured to fetch and execute computer-readable processor-executable instructions stored in the computer-readable media 1104.

Depending on the configuration of the buyer device 132, the computer-readable media 1104 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1104 may include, but is not limited to, RAM, ROM, EEPROM, flash memory, solid-state storage, magnetic disk storage, optical storage, and/or other computer-readable media technology. Further, in some cases, the buyer device 132 may access external storage, such as RAID storage systems, storage arrays, network attached storage, storage area networks, cloud storage, or any other medium that can be used to store information and that can be accessed by the processor 1102 directly or through another computing device or network. Accordingly, the computer-readable media 1104 may be computer storage media able to store instructions, modules, or components that may be executed by the processor 1102. Further, when mentioned, non-transitory computer-readable media exclude media such as energy, carrier signals, electromagnetic waves, and signals per se.

The computer-readable media 1104 may be used to store and maintain any number of functional components that are executable by the processor 1102. In some implementations, these functional components comprise instructions or programs that are executable by the processor 1102 and that, when executed, implement operational logic for performing the actions and services attributed above to the buyer device 132. Functional components of the buyer device 132 stored in the computer-readable media 1104 may include the buyer application 134, as discussed above, which may present the buyer with one or more GUIs for placing an order, some examples of which are described above. Additional functional components may include an operating system 1110 for controlling and managing various functions of the buyer device 132 and for enabling basic user interactions with the buyer device 132.

In addition, the computer-readable media 1104 may also store data, data structures and the like, that are used by the functional components. Depending on the type of the buyer device 132, the computer-readable media 1104 may also optionally include other functional components and data, such as other modules and data 1112, which may include applications, programs, drivers, etc., and the data used or generated by the functional components. Further, the buyer device 132 may include many other logical, programmatic and physical components, of which those described are merely examples that are related to the discussion herein.

The communication interface(s) 1106 may include one or more interfaces and hardware components for enabling communication with various other devices, such as over the network(s) 106 or directly. For example, communication interface(s) 1106 may enable communication through one or more of the Internet, cable networks, cellular networks, wireless networks (e.g., Wi-Fi) and wired networks (e.g., fiber optic, Ethernet), as well as close-range communications such as BLUETOOTH®, BLUETOOTH® low energy, and the like, as additionally enumerated elsewhere herein.

FIG. 11 further illustrates that the buyer device 132 may include the display 502. Depending on the type of computing device used as the buyer device 132, the display 502 may employ any suitable display technology. For example, the display 502 may be a liquid crystal display, a plasma display, a light emitting diode display, an OLED (organic light-emitting diode) display, an electronic paper display, or any other suitable type of display able to present digital content thereon. In some examples, the display 502 may have a touch sensor associated with the display 502 to provide a touchscreen display configured to receive touch inputs for enabling interaction with a GUI presented on the display 502. Accordingly, implementations herein are not limited to any particular display technology. Alternatively, in some examples, the buyer device 132 may not include a display.

The buyer device 132 may further include the one or more I/O devices 1108. The I/O devices 1108 may include speakers, a microphone, a camera, and various user controls (e.g., buttons, a joystick, a keyboard, a keypad, etc.), a haptic output device, and so forth. Other components included in the buyer device 132 may include various types of sensors, which may include a GPS receiver 1114 able to indicate location information, as well as other sensors (not shown) such as an accelerometer, gyroscope, compass, proximity sensor, and the like. In some cases, the GPS receiver 1114 may be used by the buyer application 134 to determine a current geographic location of the buyer device 132. Additionally, or alternatively, the communication interfaces 1106 may be used to determine the current location of the buyer device 132, such as based on communication with nearby cell towers, wireless access points, and the like. In some examples, the buyer application 134 may send this location information to the service computing device as an indicated delivery location for the associated buyer. Additionally, the buyer device 132 may include various other components that are not shown, examples of which include removable storage, a power source, such as a battery and power control unit, and so forth. Further, the merchant device 128 may include hardware structures and components similar to those described for the buyer device 132, but with one or more different functional components.

Figure 12:
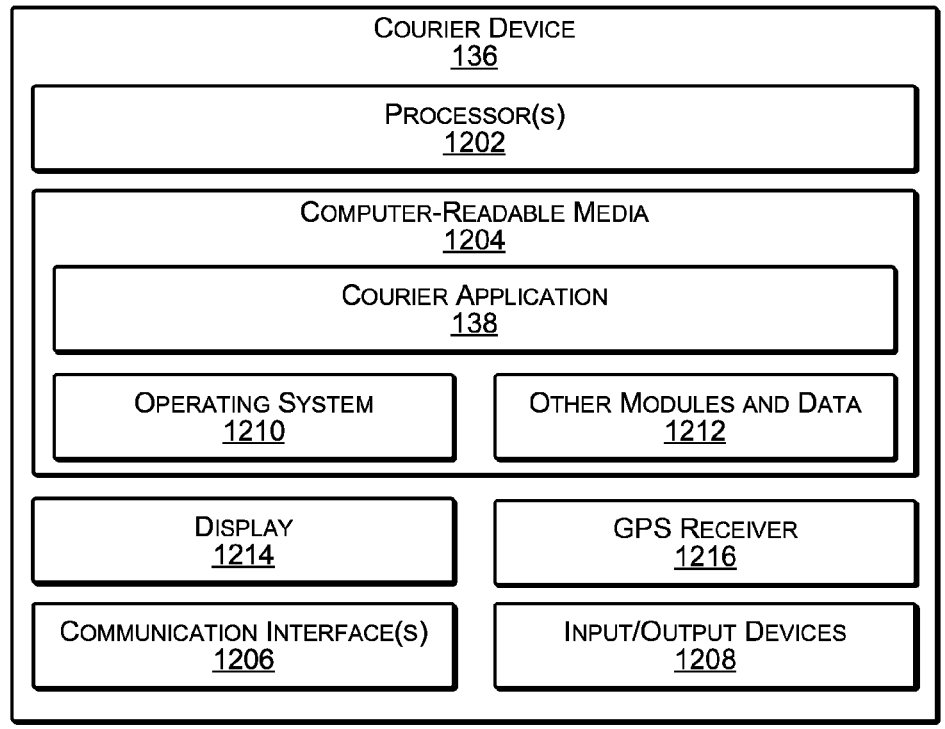
FIG. 12 illustrates select components of an example courier device according to some implementations.

FIG. 12 illustrates select example components of the courier device 136 that may implement the functionality described above according to some examples. The courier device 136 may be any of a number of different types of portable computing devices. Some examples of the courier device 136 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein.

In the example of FIG. 12, the courier device 136 includes components such as at least one processor 1202, one or more computer-readable media 1204, one or more communication interfaces 1206, and one or more input/output (I/O) devices 1208. Each processor 1202 may itself comprise one or more processors or processing cores. For example, the processor 1202 can be implemented as one or more microprocessors, microcomputers, microcontrollers, digital signal processors, central processing units, state machines, logic circuitries, and/or any devices that manipulate signals based on operational instructions. In some cases, the processor 1202 may be one or more hardware processors and/or logic circuits of any suitable type specifically programmed or configured to execute the algorithms and processes described herein. The processor 1202 can be configured to fetch and execute computer-readable processor-executable instructions stored in the computer-readable media 1204.

Depending on the configuration of the courier device 136, the computer-readable media 1204 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 1204 may include, but is not limited to, RAM, ROM, EEPROM, flash memory, solid-state storage, magnetic disk storage, optical storage, and/or other computer-readable media technology. Further, in some cases, the courier device 136 may access external storage, such as RAID storage systems, storage arrays, network attached storage, storage area networks, cloud storage, or any other medium that can be used to store information and that can be accessed by the processor 1202 directly or through another computing device or network. Accordingly, the computer-readable media 1204 may be computer storage media able to store instructions, modules, or components that may be executed by the processor 1202. Further, when mentioned, non-transitory computer-readable media exclude media such as energy, carrier signals, electromagnetic waves, and signals per se.

The computer-readable media 1204 may be used to store and maintain any number of functional components that are executable by the processor 1202. In some implementations, these functional components comprise instructions or programs that are executable by the processor 1202 and that, when executed, implement operational logic for performing the actions and services attributed above to the courier device 136. Functional components of the courier device 136 stored in the computer-readable media 1204 may include the courier application 138, as discussed above, which may present the courier with one or more GUIs, some examples of which are described above. Additional functional components may include an operating system 1210 for controlling and managing various functions of the courier device 136 and for enabling basic user interactions with the courier device 136.

In addition, the computer-readable media 1204 may also store data, data structures and the like, that are used by the functional components. Depending on the type of the courier device 136, the computer-readable media 1204 may also optionally include other functional components and data, such as other modules and data 1212, which may include applications, programs, drivers, etc., and the data used or generated by the functional components. Further, the courier device 136 may include many other logical, programmatic, and physical components, of which those described are merely examples that are related to the discussion herein.

The communication interface(s) 1206 may include one or more interfaces and hardware components for enabling communication with various other devices, such as over the network(s) 126 or directly. For example, communication interface(s) 1206 may enable communication through one or more of the Internet, cable networks, cellular networks, wireless networks (e.g., Wi-Fi) and wired networks (e.g., fiber optic, Ethernet), as well as close-range communications such as BLUETOOTH®, BLUETOOTH® low energy, and the like, as additionally enumerated elsewhere herein.

FIG. 12 further illustrates that the courier device 136 may include a display 1120, which may be the any of the types of displays 502 described above with respect to the buyer device 132. The courier device 136 may further include the one or more I/O devices 1208. The I/O devices 1208 may include speakers, a microphone, a camera, and various user controls (e.g., buttons, a joystick, a keyboard, a keypad, etc.), a haptic output device, and so forth. Other components included in the courier device 136 may include various types of sensors, which may include a GPS receiver 1216 able to indicate location information, as well as other sensors (not shown) such as an accelerometer, gyroscope, compass, proximity sensor, and the like. In some cases, the GPS receiver 1216 may be used by the courier application 138 to determine a current geographic location of the courier device 136. Additionally, or alternatively, the communication interfaces 1206 may be used to determine the current location of the courier device, such as based on communication with nearby cell towers, wireless access points, and the like. In some examples, the courier application 138 may send this location information periodically to the service computing device as an indicated location of the associated courier. Additionally, the courier device 136 may include various other components that are not shown, examples of which include removable storage, a power source, such as a battery and power control unit, and so forth.

Various instructions, methods, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system able to provide variable delivery zones to a buyer based at least in part on at least one variation in at least one local condition, the system comprising:
    a buyer device application associated with the buyer, the buyer device application configured to execute on a buyer device processor, configured to utilize a display coupled to the buyer device processor, configured to utilize a buyer device GPS receiver coupled to the buyer device processor, and configured to utilize a buyer device communication interface coupled to the buyer device processor for communicating over one or more networks;
    a plurality of courier device applications associated with a plurality of respective couriers, each courier device application configured to execute on a respective courier device processor, configured to utilize a respective courier device GPS receiver coupled to the respective courier device processor, and configured to utilize a courier device communication interface coupled to the respective courier device processor for communicating over the one or more networks, each courier device application configured to determine, based at least in part on information from the respective courier device GPS receiver, a geographic location of the courier device; and
    a service computing device application configured to execute on a service computing device processor, and configured to utilize a service computing device communication interface coupled to the service computing device processor for communicating over the one or more networks with the buyer device and the plurality of courier devices, the service computing device application configured to:
    determine, for each merchant of a plurality of merchants, one or more respective items offered for delivery by each merchant, and a respective pickup location associated with each merchant;
    determine for the one or more respective items offered by each merchant, respective predicted spoilage times associated with the respective items;
    receive, from the buyer device application, an indicated delivery location;
    determine a delivery time interval based at least in part on at least one of:
    time information received from the buyer device application indicating a desired delivery time; or
    a time at which the delivery location is received from the buyer device;
    receive, from the courier device applications over a period of time, indicated locations of the courier devices based at least in part on respective geographic locations of the courier devices determined from the information from the respective courier device GPS receivers, wherein the indicated locations enable tracking of movement of the courier devices;
    determine, based at least in part on the movement of the courier devices, traffic information for a region including the indicated delivery location;
    determine, for the delivery time interval, based at least in part on the traffic information, a respective predicted courier travel time between the indicated delivery location and the respective pickup location associated with each merchant;
    compare the respective predicted courier travel time with the respective spoilage times associated with the one or more respective items offered by each of the merchants to determine, for each merchant, at least one of:
    a first set of one or more items offered by the merchant having respective spoilage times greater than the respective predicted courier travel time;
    a second set of one or more items offered by the merchant having respective spoilage times less than the respective predicted courier travel time associated with the delivery time interval, and greater than a respective predicted courier travel time at a delivery time that is different from the delivery time interval; or
    a third set of one or more items offered by the merchant having respective spoilage times less than the predicted courier travel time regardless of the delivery time interval; and
    send, to the buyer device, item information about items available to be ordered from individual merchants of the plurality of merchants for delivery to the indicated delivery location, wherein the item information includes at least item information about the first set of items for the individual merchants;
    wherein the buyer device application is further configured to present the item information in a graphic user interface (GUI) on the display, the item information including information about items available to be ordered from the individual merchants for delivery to the indicated location within the delivery time interval.

2. The system as recited in claim 1, wherein:
    the service computing device application is further configured to send, to the buyer device, item information about the second set of items for the individual merchants; and the buyer device application is further configured to present, in the GUI, information about the items in the second set of items predicted to be available to be ordered at a later time.

3. The system as recited in claim 1, wherein the service computing device application is further configured to:

receive, from one or more buyer device applications associated with one or more respective buyers, feedback indicative of spoilage of one or more items received by the one or more buyers for past delivery orders; and determine the predicted spoilage times associated with the one or more items based at least in part on the feedback received from the one or more buyer device applications, wherein the predicted spoilage time is an amount of time between when a particular item is ready for pickup and when the particular item is categorized as being of degraded quality.

4. The system as recited in claim 1, wherein:

the plurality of courier device applications are further configured to periodically send respective location information to the service computing device application based at least in part on respective geographic locations of the courier devices determined from the respective courier device GPS receivers to enable tracking of the movement of the courier devices; and the service computing device application is further configured to:

determine, at least in part from the received courier device locations, an actual courier travel time for a past order;

compare the actual courier travel time with a predicted courier travel time for the past order to determine a difference between the predicted courier travel time and the actual courier travel time; and determine the predicted courier travel times based at least in part on the difference between the actual courier travel time and the predicted courier travel time for the past order.

* * * * *